United States Patent
Arcadu et al.

(10) Patent No.: US 12,456,190 B2
(45) Date of Patent: Oct. 28, 2025

(54) AUTOMATED ASSESSMENT OF ENDOSCOPIC DISEASE

(71) Applicants: Genentech, Inc., South San Francisco, CA (US); Hoffmann-La Roche Inc., Little Falls, NJ (US)

(72) Inventors: Fillippo Arcadu, Basel (CH); Benjamin Gutierrez-Becker, Basel (CH); Andreas Thalhammer, Basel (CH); Marco Prunotto, South San Francisco, CA (US); Young Suk Oh, South San Francisco, CA (US)

(73) Assignees: HOFFMANN-LA ROCHE INC., Little Falls, NJ (US); GENENTECH, INC., South San Francisco, CA (US)

( * ) Notice: Subject to any disclaimer, the term of this patent is extended or adjusted under 35 U.S.C. 154(b) by 638 days.

(21) Appl. No.: 17/797,293

(22) PCT Filed: Jan. 29, 2021

(86) PCT No.: PCT/EP2021/052170
§ 371 (c)(1),
(2) Date: Aug. 3, 2022

(87) PCT Pub. No.: WO2021/156152
PCT Pub. Date: Aug. 12, 2021

(65) Prior Publication Data
US 2023/0047100 A1     Feb. 16, 2023

(30) Foreign Application Priority Data

Feb. 4, 2020 (EP) .................................. 20155469

(51) Int. Cl.
G06T 7/00 (2017.01)
A61B 1/00 (2006.01)
A61B 1/31 (2006.01)

(52) U.S. Cl.
CPC ...... G06T 7/0012 (2013.01); A61B 1/000096 (2022.02); A61B 1/31 (2013.01);
(Continued)

(58) Field of Classification Search
CPC ......... G06T 7/0012; G06T 2207/10016; G06T 2207/10068; G06T 2207/20081;
(Continued)

(56) References Cited

U.S. PATENT DOCUMENTS

2016/0078625 A1* 3/2016 Tajbakhsh ............. G06T 7/0012
382/128
2018/0225820 A1 8/2018 Liang et al.
(Continued)

OTHER PUBLICATIONS

Brugman, H. et al. (2004). "Annotating Multimedia/Multi-Modal Resources with ELAN," Max-Planck-Institute for Psycholinguistics, 4 pages.
(Continued)

*Primary Examiner* — Ayodeji O Ayotunde
(74) *Attorney, Agent, or Firm* — MORRISON & FOERSTER LLP

(57) ABSTRACT

The application relates to devices and methods for analysing a colonoscopy video or a portion thereof, and for assessing the severity of ulcerative colitis in a subject by analysing a colonoscopy video obtained from the subject. Analysing a colonoscopy video comprises using a first deep neural network classifier to classify image data from the subject colonoscopy video or portion thereof into at least a first severity class (more severe endoscopic lesions) and a second severity class (less severe endoscopic lesions), wherein the first deep neural network has been trained at least in part in a weakly supervised manner using training image data from a plurality of training colonoscopy videos, the training image data comprising multiple sets of consecutive frames from the plurality of training colonoscopy videos, wherein
(Continued)

frames in a set have the same severity class label. Devices and methods for providing a tool for analysing colonoscopy videos are also described.

20 Claims, 6 Drawing Sheets

(52) U.S. Cl.
CPC ............... *G06T 2207/10016* (2013.01); *G06T 2207/10068* (2013.01); *G06T 2207/20076* (2013.01); *G06T 2207/20081* (2013.01); *G06T 2207/20084* (2013.01); *G06T 2207/30032* (2013.01); *G06T 2207/30096* (2013.01); *G06T 2207/30168* (2013.01)

(58) Field of Classification Search
CPC . G06T 2207/30032; G06T 2207/30096; G06T 2207/30168; G06V 20/69
See application file for complete search history.

(56) References Cited

U.S. PATENT DOCUMENTS

2019/0365310 A1    12/2019  Stidham et al.
2022/0398458 A1*   12/2022  Mohapatra ............... G06N 3/08
2023/0047100 A1     2/2023  Arcadu et al.

OTHER PUBLICATIONS

Cao, W. et al. (2019). "Rank—Consistent Ordinal Regression for Neural Networks," University of Wisconsin-Madison, 8 pages.
He, K. et al. (2015). "Deep Residual Learning for Image Recognition," Microsoft Research; 12 pages.
Ilse, M. et al. (2018). "Attention-Based Deep Multiple Instance Learning," International Conference on Machine Learning, 16 pages.
Panés, J. et al. (2016). "Central Endoscopy Reading in Inflammatory Bowel Diseases," Journal of Crohn's and Colitis S542-S547, 6 pages.
Rutgeerts, P. et al. (Dec. 8, 2005). "Infliximab for Induction and Maintenance Therapy for Ulcerative Colitis," N Engl. J Med. 353(23):2462-2476.
Stidham, R.W. et al. (2019, e-pub. May 17, 2019). "Performance of a Deep Learning Model vs. Human Reviewers in Grading Endoscopic Disease Severity of Patients with Ulcerative Colitis," JAMA Network Open 2(5):e193963, 14 pages.
Tejaswini, S.V.L.L. et al. (2019). "Enhanced Approach for Classification of Ulcerative Colitis Severity in Colonoscopy Videos Using CNN," Notes in Computer Science, 13 pages.

* cited by examiner

AUTOMATED ASSESSMENT OF ENDOSCOPIC DISEASE

CROSS REFERENCE TO RELATED APPLICATIONS

This application is a U.S. national stage application under 35 U.S.C. § 371 of International Application No. PCT/EP2021/052170, filed internationally on Jan. 29, 2021, which claims the priority benefit of European Patent Application No. 20155469.8, filed on Feb. 4, 2020, the disclosures of each of which are hereby incorporated by reference in their entireties.

FIELD OF THE INVENTION

The present invention relates to computer-implemented methods for analysing colonoscopy videos, as well as computing devices implementing the methods. The methods and devices of the invention find applications in the clinical assessment of inflammatory bowel diseases such as ulcerative colitis. As such, the invention also relates to methods of assessing the severity of inflammatory bowel disease, and in particular ulcerative colitis, in a patient.

BACKGROUND TO THE INVENTION

Endoscopic assessment of the presence and severity of endoscopic lesions is an established part of clinical assessment for inflammatory bowel diseases such as ulcerative colitis (UC). This assessment is subject to high variability and biases (see Panes et al., *Journal of Crohn's and Colitis*, 2016, S542-S547 for a review). Central endoscopy reading has emerged as a possible way to mitigate these problems, using independent evaluation of the endoscopy data by specially trained readers who do not have patient contact. However, this process is even more human resource intensive than the "traditional" clinical assessment, limiting its practical feasibility.

The use of machine learning approaches to automate the assessment of colonoscopy videos has been suggested. In particular, Stidham et al. (JAMA Network Open. 2019 May 2 (5):e193963) report a diagnostic study to determine whether deep learning models can grade the endoscopic severity of UC as well as experienced human reviewers. This study uses machine learning algorithms that have been trained using still images that were selected and individually scored by experts for the specific purpose of training the algorithm, providing high quality "ground truth" data for training. While they have shown some success with this approach, its practical applicability is limited by the requirement for careful manual selection of still images by an expert gastroenterologist, and by the potential biases that this is associated with (which are similar to those that central endoscopy reading aims to reduce).

Therefore, there is still a need for improved methods to automatically assess the severity of endoscopic lesions from colonoscopy videos.

STATEMENTS OF INVENTION

The inventors have developed a new device and method for analysing colonoscopy videos using deep neural network classifiers, and in particular to associate a severity class with image data from such videos. The method and device stems from the discovery that clinically meaningful assessments of severity could be obtained by analysing raw colonoscopy videos or portions thereof using a deep neural network classifier that has been trained using raw colonoscopy video data, where entire videos or segments thereof in the training data are associated with the same class label. Previous approaches to automate endoscopic assessment have used machine learning algorithms trained using still images that were selected and individually scored by experts for the specific purpose of training the algorithm, providing "ground truth" data for training. By contrast, the present inventors have discovered that it was possible to accurately classify colonoscopy videos into different severity classes using a deep neural network classifier that has been trained in a weakly supervised manner in the absence of "ground truth" data for training, using the raw (i.e. not selected on a frame-by-frame basis) expert annotated colonoscopy video data as it is commonly available as the output of e.g. clinical trials.

Expert annotated colonoscopy videos such as those produced as part of clinical assessment for inflammatory bowel diseases, even in their more rigorous forms such as central endoscopy reading, rely on the assignment, by experts, of a global severity score for each video or segment of video representative of an anatomical section of the colon. As such, not all frames in such a video will actually show the lesions that led the expert to assign the score, and the severity score for the video would not be expected to accurately capture the status of each individual frame making up the video. Further, the quality and information content can be highly variable across a video. As a result, this data is noisy and imprecise. The present inventors have surprisingly discovered that it was possible to accurately classify colonoscopy videos into different severity classes using a deep neural network classifier that has been trained in a weakly supervised manner, using such raw (i.e. not selected on a frame-by-frame basis) expert annotated colonoscopy video data.

A first aspect of the present invention thus provides a method of analysing a colonoscopy video or a portion thereof, the method comprising using a first deep neural network classifier to classify image data from the colonoscopy video or portion thereof into at least a first severity class and a second severity class, the first severity class being associated with more severe endoscopic lesions than the second severity class, wherein the first deep neural network has been trained at least in part in a weakly supervised manner using training image data from a plurality of training colonoscopy videos, wherein the training image data comprises multiple sets of consecutive frames from the plurality of training colonoscopy videos, wherein frames in a set have the same severity class label. Advantageously, the endoscopic lesions may be indicative of ulcerative colitis. In preferred embodiments, the first severity class is associated with more severe ulcerative colitis than the second severity class.

Within the context of the present invention, training a classifier in a "weakly supervised manner" means that the training data comprises data that is not "ground truth" data. Ground truth training data refers to training data where each piece of training data (e.g. each frame in a video) is assigned a training class label that is believe to truly reflect the class that the piece of training data belongs to. By contrast, the present invention uses training data that comprises data with uncertain training class labels. For example, multiple frames that form a segment in a training video may be assigned the same class label because the segment overall fulfils criteria associated with the assigned class label. However, there is no certainty that each and every frame in the particular segment shows the features that led to the segment being assigned the class label. As such, there is some uncertainty as to whether each and every frame in the segment has been assigned to the correct class, and the resulting training data only enables weak supervision of the training process. As another example, frames in a training video may be assigned a class label automatically, such as using a previously trained classifier or other machine learning algorithm. In such embodiments, there is also some uncertainty as to whether each frame has been assigned to the correct class since a classifier is not expect to be able to predict classes for previously unseen data with 100% accuracy, and the resulting training data only enables weak supervision of the training process. In its simplest form, weak supervision simply refers to the use of training data that has been assigned training class labels with an (unknown) level of uncertainty. In embodiments, the level of uncertainty in training class assignment may be quantified (such as e.g. estimated or postulated) and the uncertainty may be taken into account in the training.

Within the context of the invention, a set of consecutive frames refers to a set of frames that together form a segment of video. As such, the wording "set of consecutive frames" and "segment of video" are used interchangeably. In practice, a segment of video may not contain every single frame of the corresponding segment of raw video. Indeed, frames can be selected on a content-agnostic basis to reduce the amount of data from a video. For example, this can be performed for example by using every other frame of a 24 frames per second video (i.e. 12 frames per second). However, in the context of the present disclosure, all frames that form a segment of video will have the same label because the label was assigned to the segment, not by analysing each frame individually. Preferably, all consecutive frames that form a segment of training video that has been associated with a label are used. When not all frames are used, then data reduction (frame selection) is preferably automated (or based on fully automatable schemes), not based on manual curation. Fully automatable schemes for data reduction may comprise the selection of every other frame, the selection of every one in n frames (where n can be e.g. 2, 3, 4, etc.), the selection of every two in n frames, the random selection of n frames per second, etc.

Within the context of the present invention, the term "severity" refers to the severity of an inflammatory bowel disease, and in particular UC, as assessed by the presence of endoscopic lesions. Endoscopic lesions may include one or more of erythema, decreased or lack of vascular pattern, friability, erosions, bleeding, and ulcerations.

In embodiments, the method further comprises using a second deep neural network classifier to classify image data from the colonoscopy video or portion thereof in at least a first quality class and a second quality class, wherein the first quality class is associated with better quality images than the second quality class, wherein image data in the first quality class is provided to the first deep neural network classifier.

The inventors have found that using a separate deep neural network classifier for quality based filtering of the image data, both during training and during assessment of subject videos, significantly increased the accuracy of the severity-based classification in a context where raw videos are used for both training and assessment.

In embodiments, the second deep neural network has been trained at least in part in a weakly supervised manner using training image data from a plurality of training colonoscopy videos, wherein the training image data comprises multiple sets of consecutive frames from the plurality of training colonoscopy videos, wherein frames in a set have the same quality class label.

In embodiments, the second deep neural network has been trained at least in part in a weakly supervised manner using training image data from a plurality of training colonoscopy videos, wherein the training image data comprises multiple frames from the plurality of training colonoscopy videos that have been assigned a quality class label automatically. In some such embodiments, the quality class labels have been assigned to frames automatically using one or more previously trained machine learning algorithms (e.g. one or more classifiers, such as a deep neural network classifier as described herein).

The inventors have surprisingly found that it was possible to train a deep neural network classifier that performs quality based filtering and thereby improves the accuracy of severity-based assessment, using image data that has been annotated for quality with weak (uncertain) class labels. Weak class labels can be obtained by annotating image data on a segment-by-segment (i.e. set of frames) basis. Annotating videos by assigning quality class labels on a segment-by-segment basis is a relatively easy task that can be scaled e.g. by crowd-sourcing. However, not all individual frames in a segment will have the features that led to the assignment of the quality class label for the segment. As such, the label assigned to a set represents a weak labelling of the individual frames that make up the set. Similarly, automatically annotating videos using a previously trained machine learning algorithm is very easy and cost efficient, but not all frames can be expected to have been assigned the correct class label. In view of this uncertainty, the labels assigned to each frames represents a weak labelling. Nevertheless, the inventors have found that using such weak labels to train a deep neural network classifier for quality-based filtering was sufficient to filter the data in such a way that accurate severity-based classification is possible based on the filtered data.

In embodiments, the plurality of training colonoscopy videos used to train the second deep neural network and the plurality of training colonoscopy videos used to train the first deep neural network may partially overlap. For example, in embodiments, the training image data used to train the first deep neural network may be a subset of the training image data used to train the second deep neural network. Advantageously, the training image data used to train the first deep neural network may comprise the frames classified in the first class by the second deep neural network.

In embodiments, each set of consecutive frames in the training image data has been assigned a class label by visual inspection of the segment of video comprising the respective set of consecutive frames.

In embodiments, each set of consecutive frames in the training image data has been assigned a first quality class label if the colon walls and the colon vessels can be distinguished on visual inspection of the training colonoscopy video segment made up of the set of consecutive frames, and a second quality class label otherwise.

The inventors have surprisingly discovered that a coarse assessment of the quality of image data by segmenting colonoscopy videos into (i) sections where the colon walls and vessels are visible and (ii) sections where they are not was sufficient to inform the training of a deep neural network classifier for quality-based filtering. Advantageously, such coarse assessments can be obtained relatively quickly and can be crowd-sourced.

Advantageously, each set of consecutive frames (segment of video) in the training image data may have been assigned a first quality class label if the training colonoscopy video segment additionally satisfies one or more criteria based on the presence or absence of water, hyperreflective areas, stool and/or blurring, and a second quality class label otherwise. In embodiments, the one or more criteria include whether any water, stool or hyperreflective area together cover at most 20%, at most 15%, at most 10% or at most 5%, preferably at most 10%, of the area visible on the frames. In embodiments, the one or more criteria include whether any water, stool or hyperreflective area each cover at most 20%, at most 15%, at most 10% or at most 5%, preferably at most 10%, of the area visible on the frames. In embodiments, the one or more criteria include whether the segment of video is determined by human assessment to be blurry.

Using more stringent criteria based on the absence of artefacts in order to assign training data to the good quality class may help to increase the quality of the images that are used for training of the severity-based classifier. As the skilled person understands, when increasing the stringency of a quality-based filtering, there is a trade-off between the quality of the filtered data and the amount of data that passes the filter and is available for training. The inventors have found that using the above combination of criteria (walls and vessels visible, acceptable level of one or more artefacts) strikes a good balance and enables the provision of accurate severity-based assessments.

In embodiments, the frames in each set of frames in the training image data correspond to a single anatomical section of the colon. In other words, each set of frames may be defined such that it is limited to a single anatomical section. A full colonoscopy video may comprise multiple such segments, each segment exploring a section such as the rectum, sigmoid, or descending colon.

Using training data that is segmented by anatomical section may be particularly advantageous as it may provide more granular data for training. Further, information in relation to the anatomical section of the colon that is shown in a colonoscopy video is commonly available as part of annotated colonoscopy video data from e.g. clinical trials.

In embodiments, each set of frames in the training image data has been assigned a first severity class label if visual inspection associated the segment of training colonoscopy video comprising the set of frames with an endoscopic severity score within a first range. Optionally, each set of frames in the training image data may have been assigned a first severity class label if two independent visual inspections associated the segment of training colonoscopy video comprising the set of frames with an endoscopic severity score within a first range.

In embodiments, each set of frames in the training image data has been assigned a first severity class label if visual inspection associated the segment of training colonoscopy video comprising the set of frames with an endoscopic severity score above a threshold, and each set of frames in the training image data has been assigned a second severity class label if visual inspection associated the segment of training colonoscopy video comprising the set of frames with an endoscopic severity score at or below the threshold. In such embodiments, the first deep neural network classifier may be a binary classifier.

An endoscopic severity score may be any score that is used to quantify the severity of endoscopic lesions according to a predetermined scale. In embodiments, an endoscopic score may be associated with a particular disease, such as ulcerative colitis, where the severity of the endoscopic lesions is associated with the clinical assessment of the severity of the disease. Advantageously, the endoscopic severity score may be the Mayo Clinic endoscopic subscore (MCES). In some such embodiments, the first range may be MCES>1 or MCES>2.

The present inventors have discovered that a deep neural network classifier trained using a weakly supervised approach based on "raw" colonoscopy videos as described was able to accurately classify image data from colonoscopy videos as belonging to a class that experts would score highly on a standard endoscopic severity score scale, such as the Mayo endoscopic subscore, and a class that experts would score on a lower range of such a scale.

A binary classifier is comparatively easier to train than a more complex classifier (e.g. 3 or more classes). In other words, such a classifier may be expected to achieve high accuracy with relatively low amounts or quality of training data. By contrast, training a more complex classifier to achieve a similar performance would typically require more and/or better quality data. The present inventors have discovered that a classifier that accurately predicts a clinically relevant property of colonoscopy videos could be obtained by limiting the complexity of the training problem using two classes while relaxing the requirements on training data using "raw" annotated colonoscopy videos. As such, the present method has improved practical applicability since it uses data that is commonly available and/or easy to acquire, and produces a reliable clinically relevant prediction.

The Mayo Clinic endoscopic subscore (MCES) is a standardised scale for the evaluation of ulcerative colitis stage, based solely on endoscopic exploration. It is described in Rutgeerts P. et al. (N Engl J Med. 2005; 353 (23): 2462-2476). It comprises four levels, a first level associated with normal mucosa/inactive disease, a second level associated with mild disease activity (erythema, decreased vascular pattern, mild friability), a third level associated with moderate disease activity (marked erythema, lack of vascular pattern, friability, erosions), and a fourth level associated with severe disease activity (spontaneous bleeding, large ulcerations). In the context of the present disclosure, the first level of the Mayo endoscopic subscore scale is referred to as MCES (or Mayo)=0, the second level of the Mayo endoscopic subscore scale is referred to as MCES=1, the third level of the Mayo endoscopic subscore scale is referred to as MCES=2, and the fourth level of the Mayo endoscopic subscore scale is referred to as MCES=3.

The use of a binary classifier that classifies videos as belonging to a Mayo>1 may be particularly advantageous because a Mayo score<=1 is commonly defined as remission in clinical trials. The use of a binary classifier that classifies videos as belonging to a Mayo>2 may be particularly advantageous because a Mayo score>2 is defined as severe disease. Ideally, a classifier should be able to identify at least those videos that show signs of severe disease.

As the skilled person understands, increasing the amount of training data may enable to increase the complexity of the classifier while maintaining its performance. In particular, a first deep neural network classifier with four classes for example corresponding to the four levels of the Mayo endoscopic subscore scale may be trained and may have good performance given sufficient amounts of training data.

In embodiments, the classifier has been trained using an ordinal classification model. Ordinal classification models may be particularly appropriate when training a classifier to predict ordinal variables. A severity scale such as the MCES scale may be considered to represent such a variable, since the scale is arbitrary and only the ordering between the value is meaningful (i.e. the values set at 0, 1, 2, 3 have no other meaning other than 1 being more severe than 0, 2 being more severe than 1 and 3 being more severe than 2). As such, ordinal classification models may be advantageously used when two or more severity classes are defined, which are intended to represent increasing levels of severity.

The present inventors have discovered that a classifier that reliably predicts a clinically relevant property of colonoscopy videos, such as the four levels MCES, could be obtained even with relaxed requirements on the quality of training data using "raw" annotated colonoscopy videos, provided that sufficient amounts of training data and/or ordinal classification models is/are used. As such, the present method has improved practical applicability since it uses data that is commonly available and/or easy to acquire, and produces a reliable clinically relevant prediction. For example, the present inventors have found that a binary classifier that reliably predicts a clinically relevant property of colonoscopy videos, such as a predicted MCES>1 vs <=1, or a predicted MCES>2 vs <=2, could be obtained using "raw" colonoscopy videos as both training data and subject data, when using approximately 100 videos as training data. The present inventors have also found that a multiclass classifier that reliably predicts a clinically relevant property of colonoscopy videos, such as a predicted MCES on the full four level scale, could be obtained using "raw" colonoscopy videos as both training data and subject data, when using approximately 1000 videos as training data.

In embodiments, an ordinal classification model may be implemented by training multiple instances of the first deep neural network classifier, wherein each instance of the first deep neural network classifier is a binary classifier that computes the probability of image data belonging in a first severity class or a second severity class. In such embodiments, the probability of belonging to each of three or more severity classes (the first severity class being associated with more severe endoscopic lesions or more severe ulcerative colitis than the second severity class, and the second severity class being associated with more severe endoscopic lesions or more severe ulcerative colitis than the third severity class, etc.) can be obtained based on the combined output of the multiple instances of the multiple instances of the first deep neural network classifier. For example, a classifier that predicts the probability of image data belonging to one of four classes (classes 1 to 4, such as the four levels of the MCES, where 1 is the lowest severity—MCES=0—and 4 is the highest severity—MCES=3) can be obtained by combining the output of three binary deep neural network classifiers:

(i) a classifier that provides the probability of image data belonging to any of the severity classes other than the lowest severity class (i.e. P(data in classes>1)) and optionally the probability of image data belonging to the first class (P(data in class 1)),
(ii) a classifier that provides the probability of image data belonging to the third or higher severity classes (i.e. P(data in classes>2)), and optionally the probability of image data belonging to second class or below (P(data in class 1 or class 2)), and
(iii) a classifier that provides the probability of image data belonging to the fourth severity class (i.e. P(data in class>3), equivalent to P(data in class 4)), and optionally the probability of image data belonging to the third class or below (i.e. P(data in class<4)).

Based on these combined outputs, it is possible to calculate the probability of image data belonging to the first (lowest) severity class as P(data in class 1) or 1-P(data in classes>1). Similarly, it is possible to calculate the probability of image data belonging to the fourth (highest) severity class as P(data in class 4) or 1-P(data in classes<4). The probability of image data belonging to the second severity class can be calculated as P(data in class>1)—P(data in class>2) or 1-P(data in class>2)-P(data in class 1). Similarly, the probability of image data belonging to the third severity class can be calculated as P(data in class>2)—P(data in class>3) or 1-P(data in class>3)-P(data in class 1 or class 2).

In such embodiments, the multiple instances of the first deep neural network classifier may be trained simultaneously in order to maximise the performance of the prediction made using the combined output of the multiple instances of the first deep neural network classifier.

In embodiments, an ordinal classification model with k=1 ... K classes may be implemented by training a single CNN with K-1 binary classifiers in the output layer, where each binary classification predicts whether the image data belongs to class k>1, k>2 ... k>K-1, and the loss function for model training is adapted to minimise the loss across all binary classifiers while ensuring classifier consistency (i.e. agreement between predictions from the individual binary classifications). In embodiments, the first deep neural network classifier may be trained as described in Cao et al. (Rank-consistent Ordinal Regression for Neural Networks, 2019, arXiv:1901.07884v4, available at https://arxiv.org/pdf/1901.07884.pdf), the content of which is incorporated herein by reference.

In embodiments, the first deep neural network classifier classifies image data in three or more severity classes, wherein each set of frames in the training image data has been assigned one of the three or more severity class labels if visual inspection associated the segment of training colonoscopy video comprising the set of frames with an endoscopic severity score within a predetermined distinct range for each of the three or more severity classes. In some such embodiments, each set of frames in the training image data has been assigned one of the three or more severity class labels if two independent visual inspections associated the segment of training colonoscopy video comprising the set of frames with an endoscopic severity score within a range associated with the same said one severity class label.

In some embodiments, the endoscopic severity score is the Mayo Clinic endoscopic subscore, and the first deep neural network classifier classifies image data into four severity classes, each severity class being associated with a different Mayo Clinic endoscopic subscore.

The four level Mayo endoscopic subscore is a widely used scale for endoscopic assessment of ulcerative colitis. As such, a classifier that can classify image data into classes that correspond to or can be made to correspond to the Mayo endoscopic subscore scale may be particularly useful since its output may be directly interpretable by a clinician. Further, such a classifier may be able to use existing colonoscopy data that has been annotated with Mayo scores by directly using the Mayo scores as class labels for training.

In embodiments, the image data from the colonoscopy video or portion thereof comprises multiple consecutive frames.

The inventors have found that the method of the present invention were able to analyse a colonoscopy video or portion thereof and provide a clinically relevant severity assessment even when using "raw" colonoscopy data (i.e. data that has not been processed to select particularly informative frames). In other words, the methods of the present invention are able to provide a clinically relevant severity assessment even when the classifier(s) has/have been trained using "raw" colonoscopy videos, and are able to provide a clinically relevant assessment for a "raw" colonoscopy video. As the skilled person would understand, a deep neural network classifier typically produces an output for a single image (i.e. a single frame of a colonoscopy video). The present inventors have discovered that "raw" colonoscopy videos could be used to weakly train a deep neural network classifier to predict a severity class for multiple frames of a set of consecutive frames that together form a raw colonoscopy video or portion thereof (where some or all of the frames of a set of consecutive frames may be assessed using the first classifier, depending for example on whether a second classifier is used to determine which frames are of low quality and should not be classified by the first classifier). Indeed, the present inventors have discovered that the predictions for the multiple frames can be combined into a clinically relevant assessment for the colonoscopy video or portion thereof.

In embodiments, analysing the colonoscopy video or portion thereof comprises using the first, and optionally the second, deep neural network classifier to individually classify the multiple frames in the image data from the colonoscopy video or portion thereof.

In embodiments, classifying individual frames comprises providing, for each of the multiple frames, a probability of the frame belonging to the first class and/or a probability of the frame belonging to the second class.

In embodiments, a frame is considered to be classified in the first quality class by the second deep neural network classifier if the probability of the frame belonging to the first quality class reaches or exceeds a threshold. Advantageously, the threshold may be between 0.9 and 0.99. In embodiments, the threshold is about 0.95. In embodiments, the threshold is dynamically determined such that the sets of frames in the training image data contain on average between 20 and 40, preferably about 30, frames classified in the first quality class.

The inventors have surprisingly found that applying a naïve cut off for quality-filtering of the image data on a frame-by-frame basis was sufficient to ensure that the severity-based classification produced accurate results for the remaining frames in a set. As the skilled person understands, when increasing the stringency of a quality-based filtering, there is a trade-off between the quality of the filtered data and the amount of data that passes the filter and is available for training. The inventors have found that the above values strike a good balance in this regard.

In embodiments, analysing the colonoscopy video or portion thereof further comprises assigning a summarised severity class for the colonoscopy video or portion thereof based on the individual classification from the first deep neural network classifier for the multiple frames.

The inventors have found that a clinically relevant summary metric for a colonoscopy video could be obtained based on classification results from individual frames. In particular, such a summary metric may accurately reproduce expert endoscopic assessment metrics for colonoscopy videos such as those available from e.g. clinical trials. Surprisingly, this is the case despite variability in the individual classification for the multiple frames, and the weak labelling that is available for individual frames in the training image data.

In embodiments, classifying individual frames comprises providing, for each of the multiple frames, a probability of the frame belonging to the first severity class, and assigning a summarised severity class for the colonoscopy video or portion thereof based on the individual classification for the multiple frames comprises assigning the first severity class if the average (mean) of the probabilities of the frames belonging to the first severity class is above a threshold.

Similarly, classifying individual frames may comprise providing, for each of the multiple frames, a probability of the frame belonging to the second severity class, and assigning a summarised severity class for the colonoscopy video or portion thereof based on the individual classification for the multiple frames comprises assigning the second severity class if the average of the probabilities of the frames belonging to the second severity class is above a threshold.

The inventors have found that averaging the individual probabilities of the frames in a set belonging to the first severity class provided an accurate prediction of the class label that would be assigned by an expert to the video that comprises the frames. When performing endoscopic assessments by experts, a colonoscopy video or portion thereof is commonly assigned to the most severe category (highest severity score) that has been identified in the video. Therefore, one may have expected that the most severe category identified by the classifier in the video may have most closely reproduced the expert-based assessment process.

However, the present inventors have surprisingly found that averaging the predictions across frames in a video resulted in a more accurate prediction. Such as summarised predictor may be less sensitive to outliers, which in the context of deep neural networks trained using weak supervision may be more common than e.g. if the deep neural network had been trained using manually curated "ground truth" data.

In embodiments, other summary measures may be used instead or in addition to the average, including for example other statistical measures of central tendency such as trimmed means, medians, etc.

In some such embodiments, the threshold is between 0.5 and 0.9, such as about 0.5, about 0.6, about 0.7, about 0.8 or about 0.9. Preferably, the threshold may be about 0.5. In embodiments, assigning a summarised severity class for the colonoscopy video or portion thereof based on the individual classification for the multiple frames comprises assigning the first severity class if the average of the probabilities of the frames belonging to the first severity class is above a threshold, wherein the threshold is dynamically determined based on one or more criteria selected from: a predetermined acceptable proportion of false positives, a predetermined acceptable proportion of false negatives, a predetermined minimum accuracy (combined proportion of true positives and true negatives), a predetermined minimum precision (ratio of true positives to true and false positives), and/or a predetermined minimum recall (ratio of true positives to true positives and false negatives). When setting a threshold for assigning data to the first (higher) severity class, true positives may refer to data correctly assigned to the first severity class, true negatives may refer to data correctly assigned to the second (lower) severity class, false negatives may refer to data incorrectly assigned to the second (lower) severity class, and false positives may refer to data incorrectly assigned to the first (higher) severity class.

The inventors have surprisingly found that even naïve classification based on a probability of over 0.5 of belonging to a particular severity class was able to accurately reproduce the expert-based assessment process.

In embodiments, assigning a summarised severity class for the colonoscopy video or portion thereof based on the classification for the multiple frames comprises assigning the first severity class if the proportion of frames assigned to the first severity class is above a threshold. In embodiments, assigning a summarised severity class for the colonoscopy video or portion thereof based on the classification for the multiple frames comprises assigning the severity class that is the most represented across the multiple frames (i.e. the mode of the severity class assignments across the multiple frames).

In embodiments, assigning a summarised severity class for the colonoscopy video or portion thereof based on the classification for the multiple frames comprises assigning the highest severity class that has a proportion of frames above a threshold. For example, a summarised severity class for the colonoscopy video or portion thereof may be defined as the first (highest) severity class if the proportion of the multiple frames assigned the first severity class is above a first threshold, a second severity class if the proportion of the multiple frames assigned the second severity class is above a second threshold (and the proportion of frames assigned to the first class is not above the first threshold), optionally a third severity class if the proportion of the multiple frames assigned the third severity class is above a third threshold (and the proportion of frames assigned to the first and second classes is not above the first and second thresholds, respectively), etc. The thresholds may differ depending on the class. For example, the threshold for the first severity class may be higher than the threshold for the second and third severity class.

In embodiments, assigning a summarised severity class for the colonoscopy video or portion thereof based on the classification for the multiple frames comprises using a first deep neural network classifier that has been trained using multiple instances learning. In some such embodiments, assigning a summarised severity class for the colonoscopy video or portion thereof based on the classification for the multiple frames comprises using a first deep neural network classifier to predict a class for each frame and combining the predictions using a weighted average of the individual predictions, where the weights are determined by a neural network (attention-based pooling). For example, the multiple instance learning approach described in Ilse et al. (Attention-based Deep Multiple Instance Learning, 2018, arXiv:1802.04712v4, available at https://arxiv.org/pdf/1802.04712.pdf)—which is incorporated herein by reference, may be used.

In embodiments, the method further comprises automatically separating the colonoscopy video or portion thereof into segments, wherein each segment does not comprise frames that are classified in different severity classes by the first deep neural network classifier. In some such embodiments, a frame is considered to be classified in a specific severity class if the first deep neural network classifier outputs a probability of the frame belonging to the severity class above a threshold. Advantageously, this approach may enable to automatically detect segments of video that show a portion of the colon that shows signs of disease.

As the skilled person understands, segments of video that do not comprise frames classified in different severity classes may comprise one or more frames that were not assigned any severity classification, for example because they were filtered out for quality reasons e.g. by the second deep neural network classifiers, or because they could not confidently be assigned to a particular severity class.

In embodiments, the method further comprises assigning a summarised severity class label to each automatically created segment, wherein the summarised severity class label is based on the proportion of frames in the segment assigned to each severity class and/or the average probability of each frame belonging to each severity class. In embodiments, frames that were not assigned a severity class label by the first deep neural network classifier are assigned an equal probability of belonging to each severity class.

Separating a colonoscopy video into segments that comprise frames that have been assigned to the same class may enable the identification of sections of the colon (corresponding to continuous segments of the original colonoscopy video) that show endoscopic lesions associated with a similar severity. The use of a proportion of frames in the segment assigned to each class or the average probability of each frame belonging to each class may deal with situations where a segment comprises frames that have not been assigned a class label by the first deep neural network either because they were filtered out by the second deep neural network classifier or because the probability of the frame belonging to any class output by the first deep neural network classifier did not exceed a chosen confidence threshold.

In embodiments, frames that were filtered out by the second deep neural network classifier are assigned an equal probability of belonging to each severity class. In embodiments, the probabilities output by the first deep neural network classifier are used for frames that could not confidently be assigned to a particular severity class because the probability of the frame belonging to any class output by the first deep neural network classifier did not exceed a chosen confidence threshold.

In embodiments where a summarised severity class is obtained, the method may further comprise outputting the summarised severity class, and/or the classification from the first deep neural network classifier for each of the multiple frames.

In embodiments, the method further comprises automatically separating the colonoscopy video or portion thereof into segments by assigning an anatomical section to each frame in the colonoscopy video or portion thereof and separating the colonoscopy video or portion thereof into segments that do not comprise frames assigned to different anatomical sections. In embodiments, any summarised severity class label from the first deep neural network classifier is obtained using frames from a single segment.

In embodiments, assigning an anatomical section to each frame comprises extracting a graphical label indicative of the anatomical section from the frames. In embodiments, extracting a graphical label from the frames comprises using a third deep neural network classifier that classifies image data into multiple anatomical classes, each anatomical class corresponding to an anatomical section, based at least in part on the information in the graphical label on the frame.

Colonoscopy videos may be annotated with an anatomical segment, for example by a physician performing the colonoscopy. The information regarding the anatomical segment visible in a video or portion thereof can be included on each frame of the video through a graphical label such as e.g. a text string embedded in the image. Such graphical labels may advantageously be used to automatically separate a subject or training colonoscopy video into segments that correspond to distinct anatomical sections. These can in turn be associate with individualised severity predictions. When segmentation based on anatomical section can be performed for a subject colonoscopy video, this may increase the accuracy of the prediction and/or its clinical relevance. When segmentation based on anatomical section can be performed for at least some of the training data, this may enable the first deep neural network classifier to be trained with data that is likely to have more clinically relevant meaning.

In embodiments, the first, second and/or third deep neural network classifier(s) is/are convolutional neural network(s) (CNN). Advantageously, the CNN may have been pre-trained on unrelated image data. In embodiments, the CNN is a 50 layers CNN. In embodiments, the CNN is a CNN that has been pre-trained using a deep residual learning framework.

Convolutional neural networks have been shown to perform particularly well at image recognition tasks. Further, CNNs that have been pre-trained for image recognition tasks on large collections of image data such as the ImageNet database are available. These CNNs can be partially re-trained on new data, for example by "freezing" (i.e. not retraining) lower level layers that have been trained to identify lower level features in images (such as e.g. the convolutional layers), and retraining only higher level layers (such as e.g. the classification layers) to identify higher level features that are specifically useful for the classification problem at hand. This partial re-training means that limited amounts of data can be used to rapidly train a deep CNN since only a subset of the parameters of the CNN need to be determined by training.

Deep residual learning is a learning framework that has been developed for image recognition, to address the problem known as "degradation" (the observation that as the network depth increases, the accuracy saturates then degrades rapidly). More details on the training of CNNs using deep residual learning can be found in https://arxiv.org/pdf/1512.03385.pdf which is incorporated herein by reference.

In embodiments, the CNN is a pre-trained network that has been trained using deep residual learning, also known as ResNets. In embodiments, the CNN is ResNet50. ResNet50 is a CNN that has been trained on more than a million images from the ImageNet database, and in its native form (before re-training) can classify images into 1000 object categories including e.g. keyboard, pencil, many animals, etc. The CNN can be re-trained to perform a different image classification task.

In embodiments, the training image data comprises at least 50, at least 60, at least 70, at least 80, at least 90 or at least 100 individual colonoscopy videos. Individual colonoscopy videos are obtained from different subjects and/or at different time points.

In embodiments, the training image data comprises at least 50, at least 60, at least 70, at least 80, at least 90 or at least 100 individual colonoscopy videos from each of one or more anatomical sections of the colon. In embodiments, the training image data comprises at least 50, at least 60, at least 70, at least 80, at least 90 or at least 100 individual colonoscopy videos from each of three anatomical sections of the colon, preferably wherein the sections are the rectum, sigmoid, descending colon. In embodiments, the training image data comprises at least 50, at least 60, at least 70, at least 80, at least 90 or at least 100 individual colonoscopy videos from each of one or more (such as e.g. three) anatomical sections of the colon, and the first deep neural network classifier is a binary classifier. In embodiments, the training image data comprises at least 500, at least 600, at least 700, at least 800, at least 900 or approximately 1000 individual colonoscopy videos from each of one or more (such as e.g. three) anatomical sections of the colon, and the first deep neural network classifier is a multiclass classifier. Preferably, the first deep neural network classifier is a multiclass classifier that predicts the probability of image data belonging to one of four classes (classes 1 to 4, such as the four levels of the MCES, where 1 is the lowest severity—MCES=0—and 4 is the highest severity—MCES=3).

In embodiments, the training image data comprises on average 30 frames from each of the plurality of colonoscopy videos.

In embodiments, the training image data comprises at least 5000 frames, at least 6000 frames, at least 7000 frames, at least 8000 frames or at least 9000 frames.

In embodiments, the first deep neural network classifier is able to predict whether a set of frames belongs to the first severity class or the second severity class with an area under the receiver operator characteristic (AUC) of at least 0.7. In some such embodiments, the first deep neural network classifier is able to predict whether a set of frames belongs to the first severity class or the second severity class with an AUC of at least 0.7 after it has been trained with fewer than 150 individual colonoscopy videos.

The performance of a binary classifier can be measured by quantifying the area under the receiver operating characteristic curve (AUC). As the skilled person would be aware, the receiver operating characteristic curve, or ROC curve illustrates the diagnostic ability of a binary classifier. It can be obtained by plotting the true positive rate (TPR) against the false positive rate (FPR) at various threshold settings. For example, a ROC curve can be obtained by plotting the TPR against the FPR for different values (such as e.g. every value between 0 and 1 with a step of 0.05) of a threshold applied to the predicted probability of belonging to the first severity class. In embodiments, the performance of a multiclass classifier can be measured by quantifying the Cohen's kappa coefficient and/or the percent agreement between the predicted class and the true class. Preferably, the performance of a multiclass classifier is measured by quantifying the Cohen's kappa coefficient. As the skilled person would be aware, the Cohen's kappa can be calculated as $(p_o-p_e/1-p_e)$, where $p_o$ is the relative observed agreement between the predicted class and the true class, and $p_e$ is the probability of the predicted and true class agreeing by chance (based on the amount of data that falls in each class).

In embodiments, performance can be measured by performing cross-validation, such as e.g. 5 or 10-fold cross validation, and quantifying the AUC and/or the Cohen's kappa for each split of the cross-validation. In embodiments, the cross-validation splits are defined such that image data from the same individual colonoscopy video only appear in one of the sets. In some such embodiments, the cross-validation splits are defined such that image data from the same patient only appear in one of the sets. These may prevent possible dependencies between training image data in different splits from artificially improving the results of the cross-validation.

In embodiments, the first deep neural network classifier is able to predict whether a set of frames belongs to the first severity class or the second severity class with an AUC of at least 0.75, wherein the first severity class corresponds to a Mayo score>1 and the second severity class corresponds to a Mayo score≤1. In some such embodiments, the first deep neural network classifier is able to predict whether a set of frames belongs to the first severity class or the second severity class with an AUC of at least 0.75 after it has been trained with fewer than 150 individual colonoscopy videos.

In embodiments, the first deep neural network classifier is able to predict whether a set of frames belongs to the first severity class or the second severity class with an AUC of at least 0.75, preferably at least 0.8, wherein the first severity class corresponds to a Mayo score>2 and the second severity class corresponds to a Mayo score≤2. In some such embodiments, the first deep neural network classifier is able to predict whether a set of frames belongs to the first severity class or the second severity class with an AUC of at least 0.75 after it has been trained with fewer than 150 individual colonoscopy videos.

According to a second aspect, there is provided a method of assessing the severity of ulcerative colitis (UC) in a subject, the method comprising analysing a colonoscopy video from the subject, or a portion thereof, using the method of any of the embodiments of the first aspect.

As the skilled person understands, the method of analysing a colonoscopy video from a subject is a computer-implemented method. Indeed, image analysis using deep neural network classifiers, and methods of providing such classifiers require the analysis of large amounts of data through complex mathematical operations that are beyond the reach of mental activity.

In embodiments of the second aspect, the method further comprises treating the subject for UC. In some embodiments, the method further comprises treating the subject for UC if the first deep neural network classifies a set of frames from the colonoscopy video from the subject in the first severity class. In some embodiments, the method further comprises treating the subject for UC if the summarised severity class for a set of frames from the colonoscopy video or a portion thereof is the first severity class.

In some embodiments, the first deep neural network classifier classifies image data between a first severity class corresponding to MCES>1 and a second severity class corresponding to MCES and the method further comprises treating the subject for UC if the summarised severity class for a set of frames from the colonoscopy video or a portion thereof is the first severity class. In some embodiments, the first deep neural network classifier classifies image data between a first severity class corresponding to MCES>2 and a second severity class corresponding to MCES≤2, and the method further comprises treating the subject for UC if the summarised severity class for a set of frames from the colonoscopy video or a portion thereof is the first severity class.

In some embodiments, analysing a colonoscopy video from the subject, or a portion thereof, comprises: (i) analysing the colonoscopy video or portion thereof using a first deep neural network classifier that classifies image data between a first severity class corresponding to MCES>1 and a second severity class corresponding to MCES≤1; (ii) analysing the colonoscopy video or portion thereof using a first deep neural network classifier that classifies image data between a first severity class corresponding to MCES>2 and a second severity class corresponding to MCES≤2; and (iii) treating the subject for UC with a first treatment if at least one segment of the video is assigned a first severity class in step (ii), and with a second treatment if no segment of the video is assigned a first severity class in step (ii) but at least one a segment of the video is assigned a first severity class in step (i).

In some embodiments, analysing a colonoscopy video from the subject, or a portion thereof, comprises: (i) using the method of the first aspect to obtain a summarised severity class for one or more sets of frames from the colonoscopy video or portion thereof, wherein the first deep neural network classifier classifies image data between a first severity class corresponding to MCES>1 and a second severity class corresponding to MCES≤1; (ii) using the method of the first aspect to obtain a summarised severity class for one or more sets of frames from the colonoscopy video or portion thereof, wherein the first deep neural network classifier classifies image data between a first severity class corresponding to MCES>2 and a second severity class corresponding to MCES≤2; and (iii) treating the subject for UC with a first treatment if at least one of the summarised severity classes obtained in step (ii) is a first severity class, and with a second treatment if none of the summarised severity classes obtained in step (ii) are the first severity class but at least one of the summarised severity classes obtained in step (ii) is a first severity class.

According to a third aspect, there is provided a method of providing a tool for analysing a colonoscopy video or a portion thereof, the method comprising:

obtaining training image data comprising multiple sets of consecutive frames from a plurality of training colonoscopy videos, wherein frames in a set have the same severity class label selected from at least a first severity class and a second severity class, where the first severity class is associated with more severe endoscopic lesions than the second severity class, and training a first deep neural network to classify image data in at least a first severity class and a second severity class, wherein the training is performed in a weakly supervised manner using the training image data and the severity class label. Preferably, the endoscopic lesions are indicative of ulcerative colitis. In other words, the first severity class is preferably associated with more sever ulcerative colitis than the second severity class.

The method is preferably computer implemented. As explained above, at least the step of training a deep neural network classifier are computer implemented in any practical application. Therefore, the steps of the method may comprise a processor executing instructions to perform the said step. For example, obtaining training image data may comprise a processor executing instructions to obtain training image data from a data source (e.g. a database, computer memory, etc.). Similarly, training a first deep neural network may comprise a processor executing instructions to train a first deep neural network.

In embodiments, the method further comprises using a second deep neural network classifier to classify training image data comprising multiple frames in at least a first quality class and a second quality class, wherein the first quality class is associated with better quality images than the second class, and wherein training the first deep neural network is performed using the training image data that is classified in the first quality class by the second deep neural network classifier.

In embodiments, a frame is considered to be classified in the first quality class by the second deep neural network classifier if the probability of the frame belonging to the first quality class reaches or exceeds a threshold. The threshold may advantageously be between 0.9 and 0.99, preferably about 0.95.

In embodiments, the method further comprises:

obtaining training image data comprising multiple sets of consecutive frames from a plurality of training colonoscopy videos, wherein frames in a set of consecutive frames in the training image data have the same quality class label selected from at least a first quality class and a second quality class, where the first quality class is associated with better quality images than the second quality class; and training the second deep neural network to classify training image data in at least a first quality class and a second quality class, wherein the training is performed in a weakly supervised manner using the training image data and the quality class label.

In embodiments, the method further comprises:

obtaining training image data comprising multiple frames from a plurality of training colonoscopy videos, wherein frames in the training image data have been automatically assigned a quality class label selected from at least a first quality class and a second quality class, where the first quality class is associated with better quality images than the second quality class; optionally wherein the quality class labels have been assigned to frames automatically using one or more previously trained machine learning algorithms; and training the second deep neural network to classify training image data in at least a first quality class and a second quality class, wherein the training is performed in a weakly supervised manner using the training image data and the quality class label.

In embodiments, the training image data used to train the first deep neural network is a subset of the training image data used to train the second deep neural network.

In embodiments, the threshold used to determine whether a frame is considered to be classified in the first class by the second deep neural network classifier is dynamically determined such that the sets of frames in the training image data contains on average between 20 and 40, preferably about 30, frames after filtering.

In embodiments, obtaining training image data comprising multiple sets of consecutive frames from a plurality of training colonoscopy videos, wherein frames in a set of consecutive frames in the training image data have the same quality class label comprises assigning the quality class label to each set of consecutive frames in the training image data by:

assigning a set of consecutive frames to the first quality class if the video segment that comprises the set of consecutive frames fulfils one or more quality criteria on visual inspection, and assigning a set of consecutive frames to the second quality class otherwise.

In embodiments, the one or more quality criteria are selected from: the colon walls and the colon vessels can be distinguished on visual inspection of the training colonoscopy video segment made up of the set of consecutive frames, a criterion based on the presence or absence of water, a criterion based on the presence or absence of hyperreflective areas, a criterion based on the absence or presence of stool, and a criterion based on blurrines Advantageously, a set of consecutive frames may be assigned to the first quality class if the training colonoscopy video segment that comprises the set of consecutive frames fulfils at least the criterion that the colon walls and the colon vessels can be distinguished on visual inspection of the video segment made up of the set of consecutive frames. In embodiments, a set of consecutive frames may be assigned to the first quality class if the training colonoscopy video segment that comprises the set of consecutive frames additionally fulfils one or more of the criteria based on the presence or absence of water, hyperreflective areas, stool and/or blurring. In embodiments, a set of consecutive frames may be assigned to the first quality class if the training colonoscopy video segment that comprises the set of consecutive frames additionally fulfils all of the criteria based on the presence or absence of water, hyperreflective areas, stool and/or blurring.

In embodiments, assigning the quality class label to each set of consecutive frames in the training image data further comprises identifying a plurality of segments from the plurality of training colonoscopy videos based on whether the segment fulfils the one or more quality criteria, and assigning the corresponding quality class label to the set of consecutive frames from each segment.

In embodiments, the method further comprises assigning an anatomical section label to each frame of the plurality of training colonoscopy videos, optionally by extracting a graphical label indicative of the anatomical section from the frames. Optionally, extracting a graphical label from the frames may comprise using a third deep neural network classifier that classifies image data into multiple anatomical classes, each class corresponding to an anatomical section, based at least in part on the information in the graphical label on the frame. In embodiments, the method further comprises training the third deep neural network classifier to classify image data into multiple anatomical classes, each class corresponding to an anatomical section, based at least in part on the information in the graphical label on the frame.

In embodiments, the training image data comprises a plurality of training colonoscopy videos where segments of each video have been assigned an endoscopic severity score, and obtaining training image data comprising multiple sets of consecutive frames from the plurality of training colonoscopy videos, wherein frames in a set have the same severity class label selected from at least a first severity class and a second severity class, comprises assigning the first severity class to each set of consecutive frames that forms part of a segment that has been assigned an endoscopic severity score within a first range, and assigning the second severity class to each set of consecutive frames that forms part of a segment that has been assigned an endoscopic severity score within a second range.

In embodiments, the training image data comprises a plurality of training colonoscopy videos where segments of each training colonoscopy video have been assigned at least two independently obtained values of an endoscopic severity score, and obtaining training image data comprising multiple sets of consecutive frames from the plurality of training colonoscopy videos, wherein frames in a set have the same severity class label selected from at least a first severity class and a second severity class, comprises assigning the first severity class to each set of consecutive frames that forms part of a segment that has been assigned an endoscopic severity score within a first range for all independently obtained values of the endoscopic severity score, and assigning the second severity class to each set of consecutive frames that forms part of a segment that has been assigned an endoscopic severity score within a second range for all independently obtained values of the endoscopic severity score.

In embodiments, a set of consecutive frames in the training image data is assigned to a class if the at least two independently obtained values of an endoscopic severity score are the same. In embodiments, segments that have not been assigned the same endoscopic severity score or endoscopic severity scores within the same range are excluded from the training image data.

In embodiments, obtaining training image data comprising multiple sets of consecutive frames from the plurality of training colonoscopy videos, wherein frames in a set have the same severity class label selected from at least a first severity class and a second severity class, comprises assigning the first severity class to each set of consecutive frames that forms part of a segment that has been assigned an endoscopic severity score above a threshold, and assigning the second severity class to each set of consecutive frames that forms part of a segment that has been assigned an endoscopic severity score at or below the threshold.

In embodiments, the endoscopic severity score is the Mayo clinic endoscopic subscore. Advantageously, the first range may be MCES>1 or MCES>2. Similarly, the threshold may be a Mayo Clinic endoscopic subscore of 1 or 2.

In embodiments, the training image data comprises multiple sets of consecutive frames from a plurality of training colonoscopy videos, wherein segments of each video have been assigned an endoscopic severity score; obtaining the training image data comprises assigning one of three or more severity class labels to each set of consecutive frames if the segment of training colonoscopy video comprising the set of frames has been assigned with an endoscopic severity score within a predetermined distinct range for each of the three or more severity classes; and training the first deep neural network comprises training the first deep neural network to classify image data in the three or more severity classes.

In embodiments, the endoscopic severity score is the Mayo endoscopic subscore, and the first deep neural network classifier is trained to classify image data into four severity classes, each severity class being associated with a different Mayo endoscopic subscore.

In embodiments, the first, second and/or third deep neural network classifier(s) is/are convolutional neural network(s) (CNN). In some such embodiments, training the first, second and/or third deep neural network classifier comprises obtaining a pre-trained CNN and partially retraining the CNN using the training image data.

In embodiments, partially retraining the CNN comprises fixing the parameters of one or more of the lower layers of the CNN, and determining the parameters of the remaining (higher level) layers of the CNN. In embodiments, partially retraining the CNN comprises determining the parameters of the last 5 to 10 layers, such as e.g. 8 layers, of the CNN. In embodiments, partially retraining the CNN comprises determining the parameters of the last 10 to 20% of the layers of the CNN (e.g. for a 50 layers CNN, the last 5 to 10 layers may be retrained).

In embodiments, the CNN has been pre-trained using unrelated image data. In embodiments, the CNN is a 50 layers CNN. In embodiments, the CNN is a CNN that has been pre-trained using a deep residual learning framework. In embodiments, the CNN is ResNet50.

In embodiments, obtaining the training image data comprises obtaining at least 50, at least 60, at least 70, at least 80, at least 90 or at least 100 individual colonoscopy videos.

In embodiments, obtaining the training image data comprises obtaining at least 50, at least 60, at least 70, at least 80, at least 90 or at least 100 individual training colonoscopy videos from each of one or more, preferably three (such as the rectum, sigmoid, descending colon) anatomical sections of the colon.

In embodiments, obtaining the training image data comprises extracting on average 30 frames from each of the plurality of training colonoscopy videos.

In embodiments, obtaining the training image data comprises extracting at least 5000 frames, at least 6000 frames, at least 7000 frames, at least 8000 frames or at least 9000 frames from the plurality of training colonoscopy videos.

In embodiments, the method further comprises evaluating the performance of the first deep neural network. In embodiments, evaluating the performance of the first deep neural network comprises quantifying the area under the receiving operating characteristic curve (AUC) using validation image data. In embodiments, evaluating the performance of the first deep neural network comprises computing the Cohen's kappa using validation image data. In embodiments, validation image data comprises a subset of the training image data.

In embodiments, evaluating the performance of the first deep neural network comprises performing cross-validation using the training image data, such as e.g. 5 or 10-fold cross validation, and quantifying the AUC or the Cohen's kappa for each split of the cross-validation. In some such embodiments, performing cross-validation comprises separating the training image data into a number of splits, wherein sets of frames from the same individual colonoscopy video do not appear in more than one split.

The method of the present aspect may further include any of the features described in relation to the first aspect. In particular, any of the features related to the training of the deep neural network(s) in the first aspect, including any features related to the training data, the nature of the classes or the classifier(s), and the predictions made by the classifier(s) are explicitly envisaged in the context of the present aspect.

According to a fourth aspect, there is provided a method of assessing the severity of ulcerative colitis (UC) in a subject, the method comprising:
providing a tool for analysing a colonoscopy video or a portion thereof according to any of the embodiments of the third aspect, and
analysing a colonoscopy video from the subject, or a portion thereof, using the tool for analysing a colonoscopy video or a portion thereof.

According to a fifth aspect, there is provided a method of assessing the severity of ulcerative colitis (UC) in a subject, the method comprising:
training a first deep neural network classifiers and optionally a second and/or third deep neural network classifier using a method as described in any embodiment of the third aspect, and
analysing a colonoscopy video from the subject, or a portion thereof, using the method of the first aspect.

According to a sixth aspect, there is provided a system for assessing the severity of ulcerative colitis in a subject from a colonoscopy video obtained from the subject, the system comprising:
at least one processor; and
at least one non-transitory computer readable medium containing instructions that, when executed by the at least one processor, cause the at least one processor to perform operations comprising:
classifying image data from the colonoscopy video or portion thereof into at least a first severity class and a second severity class, wherein the first severity class is associated with more severe ulcerative colitis than the second severity class, wherein the first deep neural network has been trained at least in part in a weakly supervised manner using training image data from a plurality of training colonoscopy videos, wherein the training image data comprises multiple sets of consecutive frames from the plurality of training colonoscopy videos, wherein frames in a set have the same severity class label.

In embodiments, the instructions, when executed by the at least one processor, further cause the processor to perform the operations described in relation to any of the embodiments of the first aspect.

According to a seventh aspect, there is provided a non-transitory computer readable medium for assessing the severity of ulcerative colitis in a subject from a colonoscopy video obtained from the subject, comprising instructions that, when executed by at least one processor, cause the at least one processor to perform operations comprising: classifying image data from the colonoscopy video or portion thereof in at least a first severity class and a second severity class, wherein the first severity class is associated with more severe ulcerative colitis than the second severity class, wherein the first deep neural network has been trained at least in part in a weakly supervised manner using training image data from a plurality of training colonoscopy videos, wherein the training image data comprises multiple sets of consecutive frames from the plurality of training colonoscopy videos, wherein frames in a set have the same severity class label.

In embodiments, the instructions, when executed by the at least one processor, further cause the processor to perform the operations described in relation to any of the embodiments of the first aspect.

According to another aspect, there is provided system for analysing a colonoscopy video obtained from a subject, the system comprising: at least one processor; and at least one non-transitory computer readable medium containing instructions that, when executed by the at least one processor, cause the at least one processor to perform operations comprising:
classifying image data from the colonoscopy video or portion thereof in at least a first severity class and a second severity class, wherein the first severity class is associated with more severe endoscopic lesions (or in particular, more severe ulcerative colitis) than the second severity class, wherein the first deep neural network has been trained at least in part in a weakly supervised manner using training image data from a plurality of training colonoscopy videos, wherein the training image data comprises multiple sets of consecutive frames from the plurality of training colonoscopy videos, wherein frames in a set have the same severity class label.

According to yet another aspect, there is provided a system for classifying a colonoscopy video obtained from a subject, the system comprising: at least one processor; and at least one non-transitory computer readable medium containing instructions that, when executed by the at least one processor, cause the at least one processor to perform operations comprising:
classifying image data from the colonoscopy video or portion thereof in at least a first severity class and a second severity class, wherein the first severity class is associated with more severe endoscopic lesions (or, in particular, more severe ulcerative colitis) than the second severity class, wherein the first deep neural network has been trained at least in part in a weakly supervised manner using training image data from a plurality of training colonoscopy videos, wherein the training image data comprises multiple sets of consecutive frames from the plurality of training colonoscopy videos, wherein frames in a set have the same severity class label.

According to a further aspect, there is provided a non-transitory computer readable medium for analysing a colonoscopy video obtained from a subject, comprising instructions that, when executed by at least one processor, cause the at least one processor to perform operations comprising: classifying image data from the colonoscopy video or portion thereof in at least a first severity class and a second severity class, wherein the first severity class is associated with more severe endoscopic lesions (or, in particular, more severe ulcerative colitis) than the second severity class, wherein the first deep neural network has been trained at least in part in a weakly supervised manner using training image data from a plurality of training colonoscopy videos, wherein the training image data comprises multiple sets of consecutive frames from the plurality of training colonoscopy videos, wherein frames in a set have the same severity class label.

According to a further aspect, there is provided a non-transitory computer readable medium for classifying a colonoscopy video obtained from a subject, comprising instructions that, when executed by at least one processor, cause the at least one processor to perform operations comprising: classifying image data from the colonoscopy video or portion thereof in at least a first severity class and a second severity class, wherein the first severity class is associated with more severe endoscopic lesions (or, in particular, more severe ulcerative colitis) than the second severity class, wherein the first deep neural network has been trained at least in part in a weakly supervised manner using training image data from a plurality of training colonoscopy videos, wherein the training image data comprises multiple sets of consecutive frames from the plurality of training colonoscopy videos, wherein frames in a set have the same severity class label.

According to a further aspect, there is provided a method of treating ulcerative colitis in a subject, the method comprising analysing a colonoscopy video from the subject, or a portion thereof, using the method of any of the embodiments of the first aspect.

In some embodiments, the method further comprises treating the subject for UC if the first deep neural network classifies a set of frames from the colonoscopy video from the subject in the first severity class and/or if the summarised severity class for a set of frames from the colonoscopy video or a portion thereof is the first severity class.

In embodiments, the method comprises: (i) analysing the colonoscopy video or portion thereof using a first deep neural network classifier that classifies image data between a first severity class corresponding to MCES>1 and a second severity class corresponding to MCES≤1; (ii) analysing the colonoscopy video or portion thereof using a first deep neural network classifier that classifies image data between a first severity class corresponding to MCES>2 and a second severity class corresponding to MCES≤2; and (iii) treating the subject for UC with a first treatment if at least one segment of the video is assigned a first severity class in step (ii), and with a second treatment if no segment of the video is assigned a first severity class in step (ii) but at least one a segment of the video is assigned a first severity class in step (i).

Figure 1:
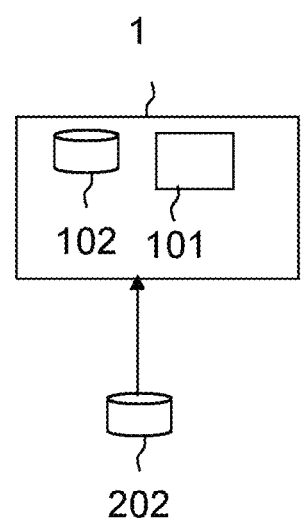
FIG. 1 shows an exemplary computing system in which embodiments of the present invention may be used.

Where the figures laid out herein illustrate embodiments of the present invention, these should not be construed as limiting to the scope of the invention. Where appropriate, like reference numerals will be used in different figures to relate to the same structural features of the illustrated embodiments.

DETAILED DESCRIPTION

Specific embodiments of the invention will be described below with reference to the Figures.

FIG. 1 shows an exemplary computing system in which embodiments of the present invention may be used. A computing device 1 comprises one or more processors 101 (which can be in the form of e.g. a server) and one or more memories 102. The computing device 1 may be equipped with means to communicate with other elements of a computing infrastructure, for example via the public internet. The computing device 1 may also comprise a user interface, which typically includes a display. In the illustrated embodiment, the computing device 1 is able to communicate with one or more external databases 202, for example to obtain training image data, receive a colonoscopy video or portion thereof to be analysed, and/or output the results of an analysis of a colonoscopy video for storage. Depending on the particular implementation, database 202 may in practice be included in database 102. In embodiments, the first computing device 1 is configured to provide a tool for analysing colonoscopy videos, as will be described further below, using training data received from database 202. In such embodiments, the memory 101 may store instructions that, when executed by the processor 102, cause the processor to execute the steps of a method of providing a tool for analysing a colonoscopy video as described herein. In some such embodiments, the tool once obtained may be provided to a second computing device (not shown) in the form of a set of instructions that, when executed by a processor of the second computing device, cause the processor to execute the steps of a method of analysing a colonoscopy video as described herein. The second computing device may comprise a user interface, such as e.g. a display, through which it can output the results of the analysis to a user. In embodiments, the first computing device 1 is configured to analyse a colonoscopy video or a portion thereof (e.g. received from database 202), and/or to automatically assess the severity of ulcerative colitis in a subject by analysing a colonoscopy video or portion thereof from the subject. In such embodiments, the memory 101 may store instructions that, when executed by the processor 102, cause the processor to execute the steps of a method of analysing a colonoscopy video, and optionally assess the severity of ulcerative colitis, as described herein.

Figure 2:
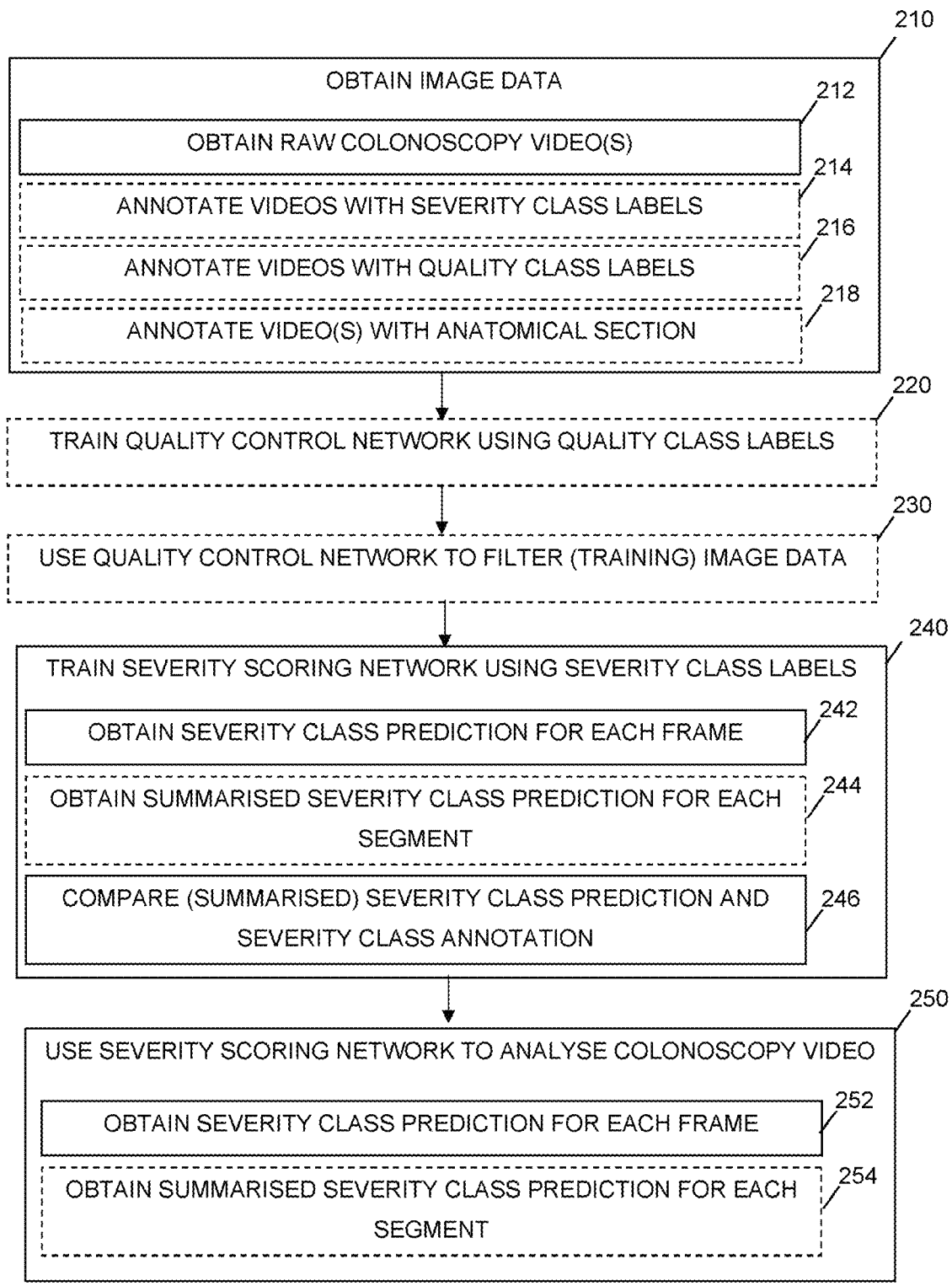
FIG. 2 is a flow chart illustrating a method of providing a tool for analysing colonoscopy videos, and a method of analysing a colonoscopy video.
Figure 3:
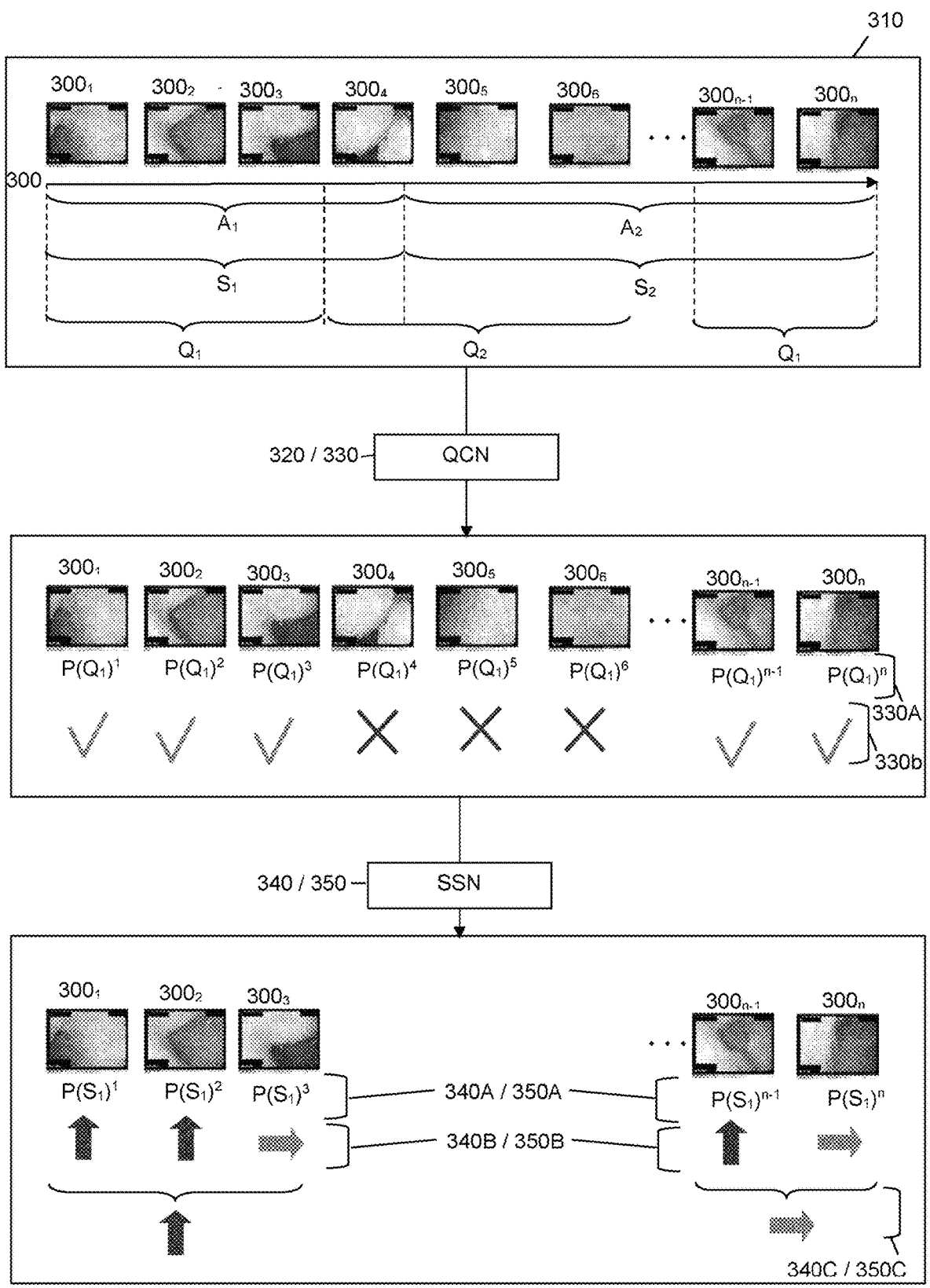
FIG. 3 illustrates schematically a method of providing a tool for analysing colonoscopy videos, and a method of analysing a colonoscopy video.

FIGS. 2 and 3 show general embodiments of a method of providing a tool for analysing colonoscopy videos, and a method of analysing a colonoscopy video. As will be explained further below, a method of providing a tool for analysing colonoscopy videos may comprise steps 210/310 (obtain (training) image data, including step 212 (obtain raw colonoscopy videos) and optionally steps 214-218 (annotate videos with anatomical section labels, quality class labels and/or severity class labels)), and step 240/340 (training severity scoring network, including steps 242 (obtain severity class prediction for each frame), 246 (compare severity class prediction with severity class labels) and optionally step 244 (obtain summarised severity class prediction)). Optionally, such a method may additionally comprise steps 220/320 (train quality control network) and 230/330 (use quality control network to filer low quality frames). A method of analysing a colonoscopy video may comprise steps 210/310 (obtain image data for analysis, including step 212 (obtain raw colonoscopy video) and optionally step 218 (annotate video with anatomical section labels)), optionally step 230/330 (use quality control network to filter low quality frames), and step 250/350 (use severity scoring network to obtain severity class prediction, including step 252 (obtain severity class prediction for each frame) and optionally step 254 (obtain summarised severity class prediction)). In other words, the training steps 220/320 (train quality control network) and 240/340 (train severity scoring network), and the associated steps of annotating 214, 216 training data with class labels (used for training), are performed as part of a method of providing a tool for analysing colonoscopy videos. By contrast, a method of analysing a colonoscopy video uses one or more classifiers that have been previously trained as described herein, and therefore does not necessarily require the training steps and associated labelling of training data.

At step 210/310, image data is obtained for training (in which case the image data is referred to as "training image data") or for analysis (in which case the image data is referred to as a colonoscopy video 300 or a portion thereof from a subject). Training image data comprises a plurality of training colonoscopy videos 300. Each colonoscopy video 300 (whether in the training data or the data for analysis) comprises a plurality of consecutive frames $300_1$ to $300_n$. In the training image data, the plurality of consecutive frames $300_1$ to $300_n$ form sets that have been assigned the same severity class label $S_1$, $S_2$. At least two severity classes are used, where the first severity class $S_1$ is associated with more severe endoscopic lesions and/or more severe ulcerative colitis than the second severity class $S_2$. In the embodiment illustrated in FIG. 3, a total of two severity classes are used, and the classifier that will be trained is a binary classifier. However, in other embodiments 3 or more classes may be used, and a corresponding multiclass classifier may be trained. The step of obtaining 210 image data for training or analysis may encompass a number of steps as illustrated on FIG. 2, some of which may be optional. In the simplest case, obtaining 210 image data for analysis may simply include obtaining 212 a raw colonoscopy video 300 from a subject, to be analysed. For example, this can be obtained from a database (such as database 202), from a user submitting data for analysis, or from a computing device directly associated with an endoscope. Optionally, the raw colonoscopy video 300 for analysis may be annotated 218 to provide labels $A_1$, $A_2$ indicative of the anatomical section visible in each of multiple segments of the video. Alternatively, anatomical section labels $A_1$, $A_2$ may already be provided with the raw colonoscopy video 300 in a machine readable form. In embodiments, segments of video may be manually annotated with anatomical section labels $A_1$, $A_2$, and each frame $300_1$ to $300_n$ may be assigned an anatomical section label corresponding to that of the segment comprising the frame $300_1$-$300_n$. Alternatively, anatomical section information may be automatically extracted from the raw colonoscopy video 300. In such embodiments, annotating 214 segments of video with anatomical section labels $300_1$ to $300_n$ comprises automatically assigning an anatomical section label $A_1$, $A_2$ to each frame $300_1$ to $300_n$ of the video 300. For example, a raw colonoscopy video 300 may be provided with graphical labels indicative of the anatomical section visible on the frame, embedded in each frame. These may be based e.g. on manual annotation of segments of the video e.g. by a medical expert at the time of acquisition. In such embodiments, annotating 214 segments of video with anatomical section labels may comprise assigning an anatomical label $A_1$, $A_2$ to each frame using a deep neural network classifier (also referred to herein as third deep neural network classifier) that has been trained to classify image data (i.e. a collection of frames $300_1$ to $300_n$) into multiple anatomical classes, each class corresponding to an anatomical section, based at least in part on the information in the graphical label embedded in the image data. Graphical labels of a limited diversity (e.g. a few different strings of text corresponding to sections of the colon such as sigmoid, rectum and descending colon) are relatively easy patterns for a deep neural network to discriminate between, and as such the error rate for this classification is expected to be very low (e.g. close to 0% or even 0% of the frames misclassified). In embodiments, a raw colonoscopy video 300 for analysis may relate to a single anatomical section, or may be divided into portions that relate to single anatomical sections, where each portion can be analysed separately as described herein. In such embodiments, no annotation with anatomical section labels may be used, an each portion of video may form its own segment.

Similarly, obtaining 210/310 training image data comprises obtaining 212 a plurality of raw colonoscopy videos 300. These videos can for example be obtained from one or more database (such as database 202). The raw colonoscopy videos 300 for training may optionally be annotated 218 to provide anatomical labels $A_1$, $A_2$ indicative of the anatomical section, as described above. The training videos 300 are accompanied with severity information provided by experts and assigned to segments of the videos. The severity information in the training image data will be used, directly or indirectly, to train a severity-based classifier (referred to as severity scoring network, SSN), as will be described further below. In practice, a segment of video 300 is a set of frames $300_1$-$300_n$, and as such all frames in a set have the same severity information. In the embodiment illustrated in FIG. 3, segments correspond to anatomical sections, such that each segment of a training video 300 comprises frames that have the same anatomical label $A_1$, $A_2$ and the same severity information. In particular, a first segment comprises frames $300_1$ to $300_4$ and a second segment comprises frames $300_5$ to $300_n$ in the embodiment shown on FIG. 3. The severity information typically comprises an endoscopic severity score. Alternatively, the severity information may comprise information that can be converted into a severity score (such as e.g. free text that can be converted to a severity score using pre-established rules). For example, the endoscopic severity score may be the Mayo Clinic endoscopic subscore (MCES). The MCES is a standard scale for scoring endoscopic lesions by visual assessment of colonoscopy videos. An MCES is commonly provided as part of the clinical assessment of an endoscopy video such as e.g. in clinical trials.

The raw colonoscopy videos 300 for training may optionally be annotated 214 with a severity class label $S_1$, $S_2$ for each segment of video that will form part of the training data. In embodiments, this comprises converting the severity information into classes $S_1$, $S_2$. For example, this may be advantageous where the severity information is in a format that is not directly compatible with the classifier to be trained. This may be the case e.g. where the severity information is not in the form of a discrete class or scale, where the number of classes is not equal to the number of classes that the classifier will be trained to discriminate, and/or where the severity information comprises assessments from more than one expert. Conversely, this step may not be necessary where the severity information is already in a format suitable for use in training the chosen classifier.

In embodiments, a set of frames (e.g. frames $300_1$ to $300_4$ on FIG. 3) in the training image data may be annotated 214 with a severity class label by assigning a first severity class label $S_1$ if visual inspection associated the segment of training colonoscopy video comprising the set of frames with an endoscopic severity score within a first range (i.e. if the severity information comprises a severity score within a first range). In other words, a set of frames (e.g. frames $300_1$ to $300_4$ on FIG. 3) in the training image data may be annotated 214 with a severity class label by assigning a first severity class label $S_1$ if the severity information for the segment of training colonoscopy video comprising the set of frames comprises an endoscopic severity score within a first range (i.e. if the severity information comprises a severity score within a first range). Where the severity information comprises assessments from more than one expert, a set of frames (e.g. frames $300_1$ to $300_4$ on FIG. 3) in the training image data may be annotated 214 with a severity class label by assigning a first severity class label if two independent visual inspections associated the segment of training colonoscopy video comprising the set of frames with an endoscopic severity score within a first range. In other words, a set of frames (e.g. frames $300_1$ to $300_4$ on FIG. 3) in the training image data may be annotated 214 with a severity class label by assigning a first severity class label if the severity information for the segment of training colonoscopy video comprising the set of frames comprises two independent endoscopic severity scores within a first range. In embodiments, a set of frames (e.g. frames $300_1$ to $300_4$ on FIG. 3) in the training image data may be annotated 214 with a severity class label by assigning a first severity class label $S_1$ if two independent visual inspections associated the segment of training colonoscopy video 300 comprising the set of frames with the same endoscopic severity score, and the endoscopic severity score is within a first range. In other words, a set of frames (e.g. frames $300_1$ to $300_4$ on FIG. 3) in the training image data may be annotated 214 with a severity class label by assigning a first severity class label if the severity information for the segment of training colonoscopy video comprising the set of frames comprises two independent endoscopic severity scores within a first range, and the two independent endoscopic severity scores are the same. Sets of frames in the training image data that do not satisfy the criteria to be annotated with a severity class label (for example because the severity information does not comprise two independent severity scores in agreement, i.e. identical or within the same range) may be excluded from the training data. A similar approach may be implemented for further severity class labels and corresponding ranges of severity scores. For example, a second severity class label $S_2$ may be assigned if the severity information comprises an endoscopy score (or two independent endoscopy scores) within a second range. In the particular case where a binary classifier will be trained, sets of frames $300_1$ to $300_n$ in the training image data may be annotated 214 with a severity class label by assigning a first severity class label Si if visual inspection associated the segment of training colonoscopy video comprising the set of frames with an endoscopic severity score above (or at least as high as) a threshold (i.e.

if the severity information comprises a severity score above a threshold). Similarly, a set of frames in the training image data may be annotated 214 with a severity class label by assigning a second severity class label $S_2$ if visual inspection associated the segment of training colonoscopy video comprising the set of frames with an endoscopic severity score at or below (or below, if class $S_1$ includes data with an endoscopic severity score at least as high as the threshold) the threshold. Criteria on agreement between multiple scores may also optionally be used in this case, as explained above. For example, where the endoscopic severity score is the MCES, a useful threshold may be MCES=1 or MCES=2, equivalent to a first range MCES>1 or MCES>2. Similar approaches may be implemented where the classifier will be trained to classify image data in three or more severity classes. In particular, a set of frames in the training image data may be annotated 214 with a severity class label by assigning one of three or more severity class labels if visual inspection associated the segment of training colonoscopy video comprising the set of frames with an endoscopic severity score within a predetermined distinct (i.e. non overlapping) range for each of the three or more severity classes. Criteria on agreement between multiple independent scores may also optionally be used in such cases, as explained above.

In embodiments, the severity information is in the form of a discrete class (such as e.g. one of the four levels of the MCES scale), and the classifier will be trained to classify image data into classes corresponding to the different discrete classes used in the severity information (such as e.g. four severity classes, each severity class corresponding to a different MCES). While no aggregation is required in such embodiments to convert the discrete classes in the severity information into classes suitable for training the classifier, the step of annotating 214 the videos 300 for training with a severity class label $S_1$, $S_2$ for each segment of video 300 that will form part of the training data may still be performed in some embodiments. For example, where the severity information comprises multiple scores e.g. provided by independent experts, a single class label may be derived from the severity information. In some such embodiments, a set of frames in the training image data may be annotated 214 with a severity class label by assigning a first (respectively second, third, etc. depending on the number of classes) severity class label if two independent visual inspections associated the segment of training colonoscopy video comprising the set of frames with the same, first (respectively second, third, etc.) endoscopic severity score.

At optional step 216, the raw colonoscopy videos 300 for training may be annotated with a quality class label $Q_1$, $Q_2$ for each segment of video 300 that will form part of the training data. This may be advantageous where a classifier, preferably a deep neural network also referred to herein as quality control network (QCN) or second deep neural network classifier, is trained 220 and used 230 to filter low quality frames from the training data that will be used to train the severity-based classifier (SSN). Annotating the training image data with quality class labels $Q_1$, $Q_2$ (or extracting quality class labels from previously annotated data) enables such a classifier to be trained. Step 216 may be performed by manually assigning a quality class label $Q_1$, $Q_2$ to segments of video in the training data, based on one or more criteria. Advantageously, these criteria may apply to a visual inspection of the videos 300. For example, a first (good quality) quality class label $Q_1$ may be assigned to a segment of training colonoscopy video 300 if the colon walls and the colon vessels can be distinguished on visual inspection, and a second quality class label otherwise. Optionally, a segment of training colonoscopy video 300 may be assigned a first quality class label $Q_1$ if it additionally satisfies one or more visual inspection criteria based on the presence or absence of water, hyperreflective areas, stool and/or blurring, and a second quality class label $Q_2$ otherwise. Visual inspection may be crowdsourced, and/or may be performed by non-experts. Assignment of quality class labels Q1, $Q_2$ to training colonoscopy videos 300 may be performed using any means that enables the annotation of video files. Further, a single quality annotation may be sufficient. As the skilled person understand, when the quality annotation is performed on a segment by segment basis, segments comprise multiple consecutive frames and each such frame will inherit the label of the segment that it is part of. In cases where multiple independent quality annotations are performed, their results may be combined on a frame-by-frame basis using any appropriate scheme, such as e.g. assigning the most common quality class label for the frame across the independent quality annotations, assigning the lowest quality class label across the independent quality annotations, assigning the lowest quality class label that is represented above a threshold across the independent quality annotations, etc. As illustrated on FIG. 3, there is typically no requirement for the segments annotated with the same quality class label $Q_1$, $Q_2$ to correspond to the segments annotated with the same severity class label $S_1$, $S_2$, or anatomical label $A_1$, $A_2$. By contrast, segments of training videos 300 that have the same anatomical label $A_1$, $A_2$ may have the same severity class label $S_1$, $S_2$ because severity information is typically provided in a clinical setting on an anatomical section-basis (e.g. one severity score per anatomical section). In other embodiments, the raw colonoscopy videos 300 for training may be automatically annotated with a quality class label $Q_1$, $Q_2$ for each segment of video 300 or each individual frame that will form part of the training data. In such embodiments, previously trained classifiers (such as e.g. deep neural network classifiers) may be used to perform the annotation.

As a result of the step 210, training image data is obtained that comprises multiple sets of frames $300_1$ to $300_n$ from multiple colonoscopy videos, each frame $300_1$ to $300_n$ being associated with a severity class label $S_1$, $S_2$ and optionally a quality class label $Q_1$, $Q_2$ and/or an anatomical label $A_1$, $A_2$. Where quality class labels $Q_1$, $Q_2$ are present in the training data, optional steps 220, 320 and 230, 330 may be implemented in a method of providing a tool as described herein. In step 220, a deep neural network classifier (referred to as quality control network, QCN) may be trained 220 to classify frames into corresponding quality classes. The QCN may be subsequently used 230 to filter image data (whether training image data, in the context of a method of providing a tool as described herein, or data from a colonoscopy video for analysis). The training 220 is performed in a weakly supervised manner because the quality class labels $Q_1$, $Q_2$ are assigned to frames based on segment-level annotations and/or are automatically assigned to segments or individual frames using previously trained classifiers. As such, these frames-quality class pairs do not represent ground truth information since there is a relatively high level of uncertainty in relation to the quality class assignment of each particular frame. Indeed, not all frames in a segment are expected to display the features that led to the assignment of the quality label to the segment containing the frame, and/or any previously trained classifier is expected to have a less than 100% accuracy in classifying previously unseen data. Once trained, the QCN can be used 230,330 to filter image data that before it is classified by the severity scoring network as will be described further below. In particular, in the embodiment illustrated on FIG. 3, the QCN takes as input individual frames $300_1$ to $300_n$ of training or analysis videos 300, and produces as an output 330A a probability of the frame belonging to the first class $P(Q_1)^1$–$P(Q_1)^n$ and/or a probability of the frame belonging to the second class. A discrete classification label 330B is derived from this in order to decide which frames are in the lower quality class and should be filtered out, as illustrated by the ticks and crosses. In practice, a discrete classification label 330B may only be implicitly derived, by excluding frames that do not satisfy the criteria applied to decide which frames are in the higher quality class. For example, a frame (e.g. frame $300_1$) may be considered to be classified in the first quality class by the QCN if the probability $P(Q_1)^1$ of the frame belonging to the first quality class reaches or exceeds a threshold, and in the second class otherwise. The threshold can be chosen a priori or dynamically (i.e. depending on the particular instance of the QCN and data). For example, the threshold can be determined dynamically such that the sets of frames (i.e. sets of consecutive frames that have been assigned the same severity class and optionally the same anatomical section label) in the training image data contain on average between 20 and 40, preferably about 30, frames classified in the first quality class. Thresholds between 0.9 and 0.99, preferably 0.95 were found suitable.

The (optionally quality filtered) training data is used at step 240/340 to train a severity-based deep neural network (SSN, also referred to herein as first deep neural network classifier) to classify data into severity classes, using the severity class labels $S_1$, $S_2$ previously obtained. The training 240/340 is performed in a weakly supervised manner because the severity class labels $S_1$, $S_2$ are assigned to frames based on segment-level annotations. As such, these frames-severity class pairs do not represent ground truth information since not all frames in a segment are expected to display the features that led to the assignment of the severity class label to the segment containing the frame. The trained SSN can be used 250/350 to analyse colonoscopy videos. The SSN takes as input individual frames $300_1$-$300_n$ and produces 242/252 as output a severity class prediction for each frame that is analysed. In particular, in the embodiment illustrated on FIG. 3, the SSN takes as input individual frames $300_1$-$300_n$ of training or analysis videos 300 (or individual frames $300_1$-$300_3$ and $300_{n-1}$-$300_n$ if quality-based filtering is used), and produces as an output 340A/350A a probability of the frame belonging to the first class $P(S_1)^1$ to $P(S_1)^n$ and/or a probability of the frame belonging to the second class. In order to evaluate the performance of the SSN during training, a discrete classification label 340B/350B may be derived from these probabilities and compared 246 to the severity class annotation on a frame-by-frame basis. The discrete classification label 340B/350B may be obtained by applying a threshold on the probability or probabilities output by the SSN. For example, a frame (e.g. frame $300_1$) may be assigned to the first class if the probability (e.g. $P(S_1)^1$) of the frame belonging to the first class is above a threshold. Frames may be assigned to the second class otherwise, or may be considered to have unknown classification if the probability of the frame being in the first class is within a range, typically a range around 0.5. Similarly, for multilevel classifiers, a frame may be assigned to the class that has the highest probability, provided that this exceeds a threshold. Alternatively, frames may be assigned to the class that has the highest probability, regardless of the actual value of the probability.

Optional steps 244 and/or 254 may additionally be implemented wherein a summarised severity class prediction 340C/350C is obtained for segment of video, based on the predictions (340A/350A or 340B/350B) for each of the frames that make up the segment (and that have been analysed with the SSN). In the example illustrated on FIG. 3, frames that belong to the same segment are grouped together based on the anatomical section label $A_1$. As the severity information for the training data was assigned per anatomical section, the summarised severity class prediction 340C may be directly compared with the original severity information in step 246, in order to evaluate the performance of the SSN, during training 240. Further, for the purpose of analysing a colonoscopy video, obtaining 254 a summarised severity class prediction 350C per anatomical segment may also be useful since it replicates the granularity used in conventional clinical assessments. Alternatively, for the purpose of analysing a colonoscopy video the segments based on which a summarised severity class prediction 340C/350C is obtained may be automatically determined, preferably without a priori information about the data. For example, a segment may be defined as a set of consecutive frames where all of the frames have the same discrete class assignment 350B, or do not have a discrete class assignment 350B (i.e. it is unknown or the frame was excluded for e.g. quality reasons).

The summarised severity class 340C/350C for a segment comprising multiple frames may be obtained 244/254 directly based on the probabilities 340A/350A output by the SSN, or based on the discrete class assignments 340B/350B derived from these probabilities. In embodiments, a summarised severity class 340C/350C for a segment may be obtained 244/254 by assigning the first severity class to the segment if the average of the probabilities 340A/350A of the frames belonging to the first severity class output by the SSN is above a threshold. In the embodiment shown on FIG. 3, a summarised severity class 340C/350C for the segment comprising frames $300_1$ to $300_3$ may be obtained 244/254 by assigning the first severity class to the segment if the average of the probabilities 340A/350A of the frames $300_1$ to $300_3$ belonging to the first severity class $(P(Si)^1$ to $P(S_1)^3)$ output by the SSN is above a threshold. The threshold may be fixed. Alternatively, the threshold may be dynamically determined based on one or more criteria selected from: a predetermined acceptable proportion of false positives, a predetermined acceptable proportion of false negatives, a predetermined minimum accuracy, a predetermined minimum precision, and/or a predetermined minimum recall. Thresholds between 0.5 and 0.9 have been found appropriate. As another example, a summarised severity class 340C/350C for a segment may be obtained 244/254 by assigning the first severity class to the segment if the proportion of frames assigned to the first severity class is above a threshold. In the example illustrated on FIG. 3, assuming a threshold of 0.5, the summarised severity class 340C/350C for the segment comprising frames $300_1$ to $300_3$ is assigned as the first severity class because 66% of the frames $300_1$ to $300_3$ are assigned to the first severity class. By contrast, the summarised severity class 340C/350C for the segment comprising frames $300_{n-1}$ to $300_n$ is assigned as the second severity class because 50% of the frames $300_{n-1}$ to $300_n$ are assigned to the first severity class. Other schemes may be used, for example where more than two classes are used. For example, a summarised severity class 340C/350C for a segment may be obtained 244/254 by assigning to the segment the highest severity class (i.e. the most severe class) that is represented amongst the discrete class assignments 340B/350C for the frames of the segment above a threshold for the respective severity class. The threshold may be lower for higher severity classes (i.e. requiring a lower proportion of the frames in the segment assigned the discrete severity class label 340B/350B). Indeed, higher severity classes are expected to be easier to identify (and as such predictions in the higher severity class may be made with higher confidence).

All of the deep neural network classifiers described herein are preferably convolutional neural network(s) (CNN). Advantageously, the CNNs used may have been pre-trained on unrelated image data, such as for example from the ImageNet database (http://www.image-net.org). The present inventors have found a 50 layers CNN to be adequate for the present use, but alternative implementations including e.g. additional layers are envisaged. CNNs trained using a deep residual learning framework (He et al., Deep Residual Learning for Image Recognition, 2015, arXiv:1512.03385, available at https://arxiv.org/pdf/1512.03385.pdf and incorporated herein by reference) have been found to be particularly suitable.

In step 246, the predictions from the SSN are compared to the corresponding severity class labels (derived from the severity information in the training data) in order to evaluate the performance of the SSN. In embodiments, evaluating the performance of the SSN (first deep neural network) comprises quantifying the area under the receiving operating characteristic curve (AUC) using validation image data. In embodiments, evaluating the performance of the SSN comprises computing the Cohen's kappa using validation image data. The validation and training image data may form part of the same data, and in particular have all of the same characteristics as described above. A particular example of this is the evaluation of the SSN by performing cross-validation using the training image data, such as e.g. 5 or 10-fold cross validation. In embodiments, evaluating the performance of the first deep neural network comprises performing 5 or 10-fold cross validation using the training image data, and quantifying the AUC or the Cohen's kappa for each split of the cross-validation. Preferably, the training image data is separated into a number of splits for cross-validation, wherein sets of frames from the same individual colonoscopy video do not appear in more than one split.

The output of the SSN, including for example the summarised severity class 350C and/or the predictions for each frame (probabilities 350A of belonging to one or more classes or discrete class assignments 350B), may be output to a user, for example using a display. This information may be useful in assessing the severity of ulcerative colitis in a subject, particularly where the output of the SSN corresponds to endoscopic severity scores or ranges of scores, such as the MCES.

A method of assessing the severity of ulcerative colitis in a subject will now be described by reference to FIG. 4. A colonoscopy video 400 from the subject (or a portion thereof, such as e.g. a portion that shows a single anatomical section, a portion that does not include all of the original data to reduce its size, etc.), for example obtained from a user via a user interface or from a database 202, is analysed as described above by reference to FIGS. 2 and 3. In particular, the image data from the colonoscopy video 400 (i.e. all of the frames of the colonoscopy video 400) is optionally provided to a QCN to apply 430 a quality-based filter to the frames by classifying each frame in at least a first quality class and a second quality class, where only frames in the first quality class are used for the severity assessment. The (optionally filtered) image data 435 (i.e. all or some of the frames of the colonoscopy video 400, depending on whether quality-based filtering is used) is then assessed 450A/450B for severity of ulcerative colitis using a SSN that classifies the data 435 into at least a first severity class and a second severity class, the first severity class being associated with more severe ulcerative colitis than the second severity class. In the embodiment shown on FIG. 4, two separate severity assessments 450A/450B of the image data 435 are performed: a first SSN is used in assessment 450A to classify image data between a first severity class corresponding to MCES>1 and a second severity class corresponding to MCES≤1. A second SSN is used in assessment 450B to classify image data between a first severity class corresponding to MCES>2 and a second severity class corresponding to MCES≤2. Other configurations are possible and envisaged, such as e.g. configurations that use more than two separate severity assessments with different SSNs, a single severity assessment using a multiclass SSN, one or more separate severity assessments that use SSNs classifying data into classes that correspond to values of one or more different endoscopic scoring schemes (including but not limited to MCES), etc. Each SSN produces as an output 455A/455B probabilities that each frame of the data 435 or each segment (set of frames in the data) belongs to the first severity class, or discrete severity classes derived from these probabilities. These outputs 455A/455B are used to decide the appropriate course of treatment for the subject at steps 460/470. In particular, at step 460 it is determined whether the output 455B from the second assessment 450B is indicative of a MCES>2. For example, if a summarised class prediction derived from the predictions of SSN2 for any segment of the data 435 is the first severity class, then the output 455B from the second assessment 450B may be considered to be indicative of a MCES>2. If that is the case, then the subject is selected 465 for a first treatment. If that is not the case, then it is determined at step 470 whether the output 455A from the first assessment 450A is indicative of a MCES>1. For example, if a summarised class prediction derived from the predictions of SSN1 for any segment of the data 435 is the first severity class, then the output 455A from the first assessment 450A may be considered to be indicative of a MCES>1. If that is the case, then the subject is selected 475 for a second treatment. Selecting a subject for treatment may refer to recommending the treatment and/or identifying the subject as likely to benefit from the treatment and/or identifying the subject as likely to require the particular treatment. Optionally, the method may further comprising treating the subject in accordance with the selected treatment.

Figure 4:
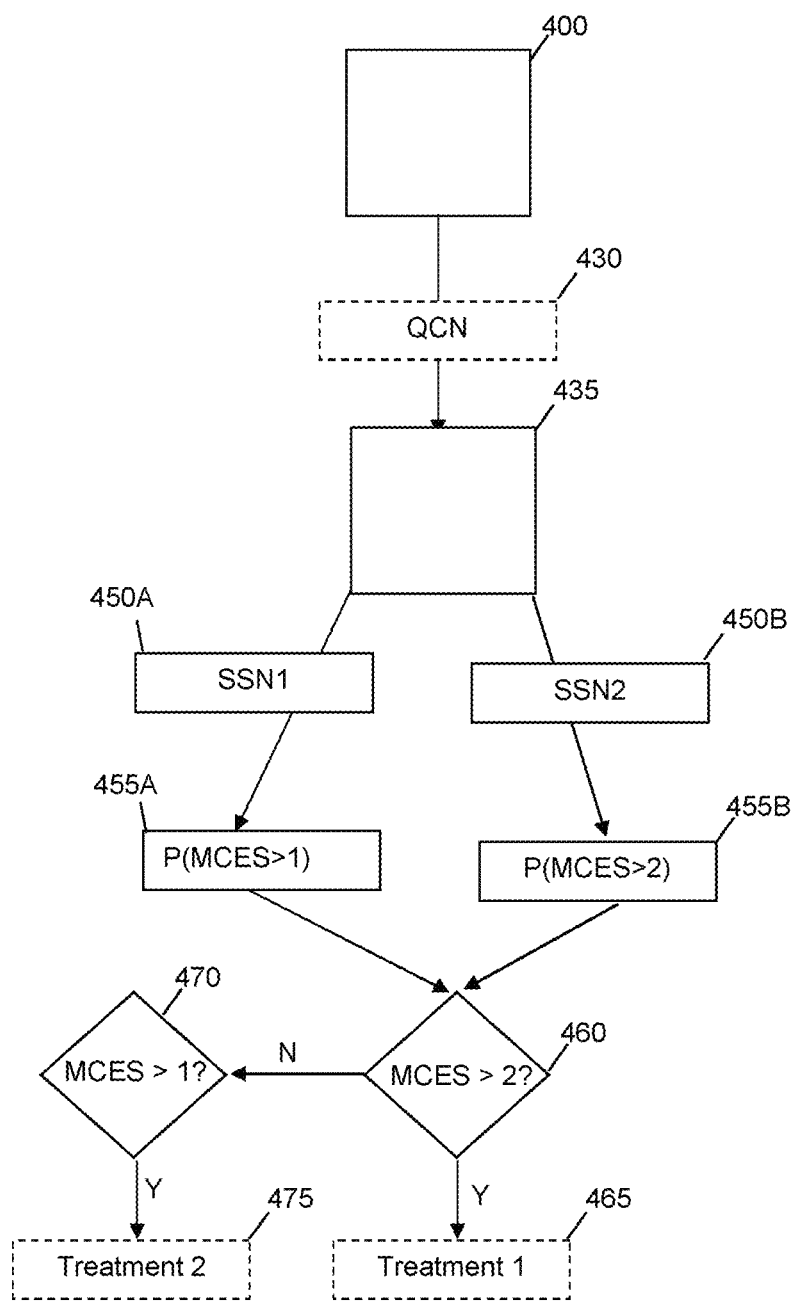
FIG. 4 illustrates schematically a method of assessing the severity of ulcerative colitis in a subject.

In other embodiments, a single severity assessment may be performed, such as e.g. using the second SNN (SSN2) illustrated on FIG. 4. In such embodiments, the method may comprise treating the subject for UC, or selecting the subject for treatment for UC (i.e. recommending treatment, identifying the subject as one likely to benefit from and/or require treatment) if the output from this assessment is indicative of the first severity class. This may be the case for example where the SSN classifies a set of frames from the image data 400 in the first severity class, or if any set of frames from the image data 400 has a first summarised severity class.

As the skilled person would understand, references to using a deep neural network to classify image data (based on severity or quality) may in practice encompass using a plurality of deep neural networks and combining the predictions of the multiple deep neural networks. Each of such a plurality of deep neural networks may have the properties described herein. Similarly, references to training a deep neural network may in fact encompass the training of multiple deep neural networks as described herein, some or all of which may subsequently be used to classify image data according to quality or severity, as the case may be.

EXAMPLES

An exemplary method of providing a tool for analysing colonoscopy videos will now be described. Over 2000 colonoscopy videos were obtained from the HICKORY (NCT02100696) and LAUREL (NCT02165215) clinical trials—both phase III, double-blind, placebo-controlled, multicenter studies investigating the efficacy and safety of etrolizumab in the treatment of patients with moderately to severely active ulcerative colitis (UC). Each video was annotated by expert gastroenterologists as part of the clinical trials, to indicate: (1) the anatomical section (rectum, sigmoid, descending colon), and (2) MCES evaluation for each anatomical section, from two different readers. A total of 104 raw colonoscopy videos were selected by filtering out videos where the two readers did not agree on the MCES for each anatomical section, and videos where the readers flagged quality issues such as e.g. inappropriate bowel preparation, suboptimal video quality.

Manual quality annotation of each of the 104 raw colonoscopy videos was performed by non-experts, who were asked to define segments of videos that are considered "good quality" or "bad quality". This was performed based on the following criteria: (i) the camera is far enough from the colon walls to allow for a proper assessment, (ii) the colon walls and its vessels can be assessed at visual inspection, and (iii) visual artifacts are not present or do not occupy more than approximately 10% of the frame. Visual artifacts that were observed included: water, hyperreflective areas, stools, blurring. This was in practice performed by non-experts watching the videos and highlighting segments of good/bad quality while watching using ELAN (https://tla.mpi.nl/tools/tla-tools/elan/; Brugman, H., Russel, A. (2004). Annotating Multimedia/Multi-modal resources with ELAN. In: Proceedings of LREC 2004, Fourth International Conference on Language Resources and Evaluation).

The anatomical section annotation was included as a graphical label on each frame of each raw video in these clinical trials. A deep neural network (anatomical section network) was trained to classify each frame of each video into one of the three anatomical section categories (rectum, sigmoid, descending colon) by focussing on the area of the frames comprising the graphical label. This was performed by partially retraining the 50 layers convolutional neural network ResNet50, using Keras (https://keras.io/). In particular, the last 8 layers of ReNet50 were retrained using the stochastic gradient descent (SGD) optimiser as implemented in Keras. The learning rate used was 0.001 and the momentum was 0.9. The trained anatomical section network was able to assign an anatomical section with high confidence for each frame of each video. The result of this process is that for each frame of each of the 104 videos, the following 3 annotations are available: anatomical section (from the anatomical section network), quality class (from the non-expert segment-level annotation), MCES (from the expert segment level annotation). The quality class and MCES are weak labels at least because they were provided in relation to entire segments, where the multiple frames forming a segment are unlikely to all show the visual features that led to the assignment of the label. In particular, for MCES scoring, an anatomical section of colon is assigned the score that corresponds to the most severe lesions seen in the section. In other words, an entire segment of video showing the sigmoid will be assigned an MCES=3 if both readers saw signs of moderate disease activity (marked erythema, lack of vascular pattern, friability, erosions) anywhere in this anatomical section. However, some of the frames in this section may not show these signs. The MCES scoring was converted into a binary severity classification according to two different schemes. A first scheme assigned severity class label 1 to a segment of the MCES scores from the readers were >1, and a severity class label 2 otherwise. A second scheme assigned severity class label 2 to a segment of the MCES scores from the readers were >2, and a severity class label 2 otherwise All 104 videos included 24 frames per second, and all frames were used for training of the quality control network (QCN). A deep neural network (quality control network) was trained to classify each frame of each of the 104 raw videos into a good quality category and a bad quality category. In particular, the quality control network was trained to provide, for each frame, a probability of the frame belonging to the "good quality" class. This was performed by partially retraining the 50 layers convolutional neural network ResNet50, using Keras as explained above. In particular, the last 8 layers were retrained using SGD, a learning rate of 0.001 and a momentum of 0.9. Frames were considered to be classified as "good quality" if the predicted probability of the frame belonging to the "good quality" class (P(good)) exceeded 0.97. This threshold led to the selection of about 20 frames per raw colonoscopy video. A threshold of 0.95, leading to the selection of about 30 frames per raw colonoscopy video (about 9360 frames in total) was also tested, with similar results (not shown). Further, the AUC for the trained QCN was 0.93±0.05.

A total of about 6200 frames predicted to be of "good quality" (according to the threshold of P(good)>0.97) were selected. All of these frames were used to separately train two deep neural networks (severity scoring networks, SSN): a first SSN used the binary severity classification labels according to the first binary scheme described above (MCES>1, MCES≤1), and a second SSN used the binary severity classification labels according to the second binary scheme described above (MCES>2, MCES≤2). As a result, the first SSN was trained to output, for each frame, a probability of the frame belonging to the first severity class MCES>1, P(MCES>1). Similarly, the second SSN was trained to output, for each frame, a probability of the frame belonging to the first severity class MCES>2, P(MCES>1). Both SSNs were trained by partially retraining the 50 layers convolutional neural network ResNet50, using as explained above. A frame was considered to be assigned to the first severity class by the first and second severity scoring networks if P(MCES>1)>0.5 and P(MCES>2)>0.5, respectively. A summary classification was computed for each anatomical section of each video (using the anatomical section label from the anatomical section network) by computing the average probability of class 1 across all frames from the same anatomical section A of the same video Y. A segment was considered to be assigned a first severity class label by the first and second severity scoring networks if average($P_{A,Y}$(MCES>1))>0.5 and average($P_{A,Y}$(MCES>2)) >0.5, respectively.

The two SSNs were evaluated retrospectively by performing five-fold cross validation using the same data that was used for training. In particular, the approx. 6200 quality selected frames were divided into training, tuning and validation sets according to the following scheme: 60%, 20%, 20%, with the additional rule that frames coming from videos from the same patient only appear in one of the sets.

The ROC curve was calculated for each iteration of the 5-fold validation by varying the threshold applied to classify a segment in the first severity class, comparing the predicted class assignment and the expert-derived class assignment (binary severity classification labels derived from the expert annotations according to the binary schemes described above), and calculating the corresponding false positive and false negative rates. Corresponding areas under the curve (AUC) were also calculated for each ROC curve. An average ROC curve and corresponding standard deviation were then calculated, as well as the AUC for the average ROC curve.

Figure 5A:
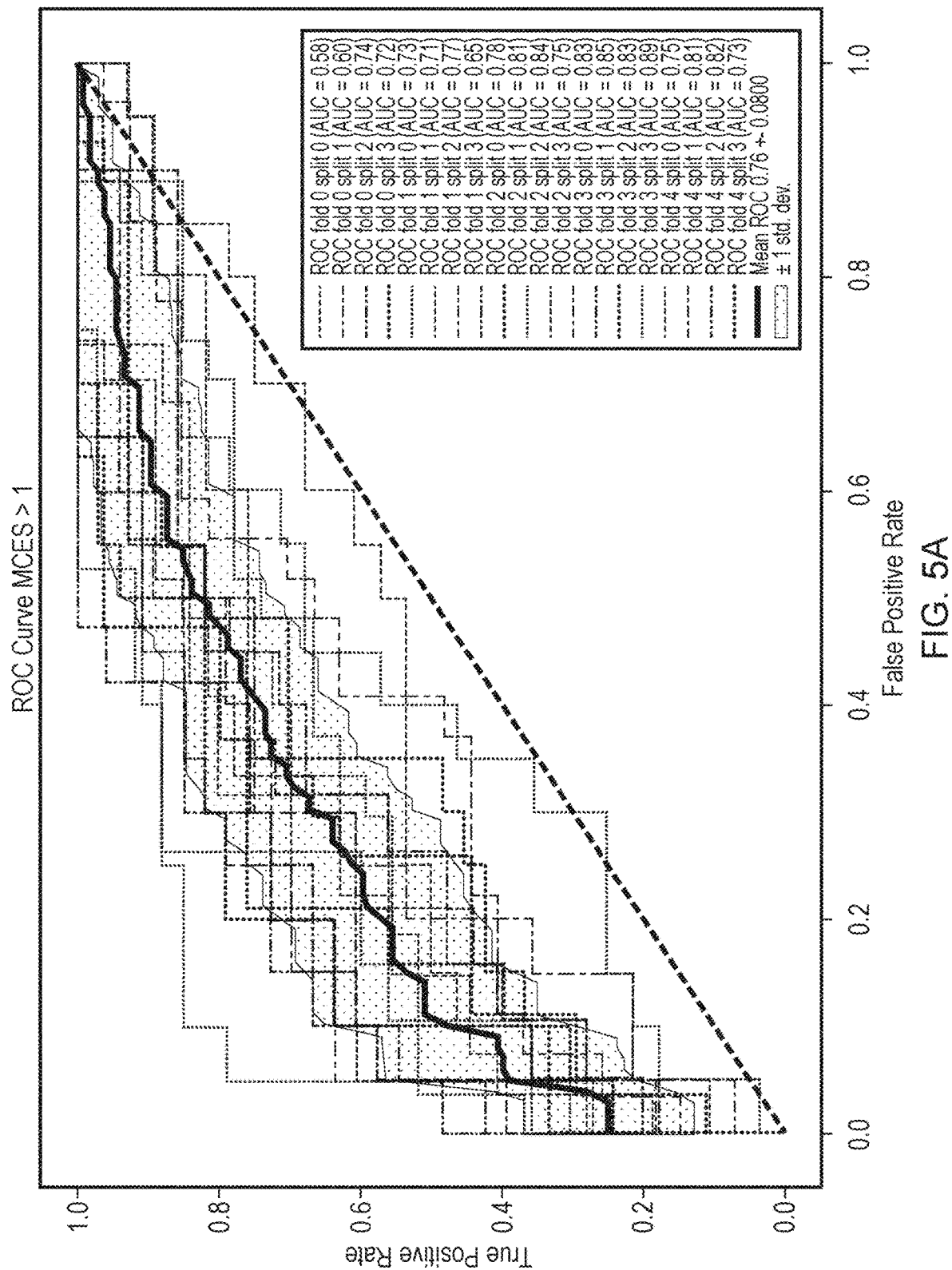
FIGS. 5A and 5B show receiver operator characteristic (ROC) curves for an exemplary deep neural network classifying image data from colonoscopy videos in a first severity class corresponding to MCES>1 and a second severity class corresponding to MCES≤1 (FIG. 5A), and an exemplary deep neural network classifying image data from colonoscopy videos in a first severity class corresponding to MCES>2 and a second severity class corresponding to MCES≤2 (FIG. 5B).
Figure 5B:
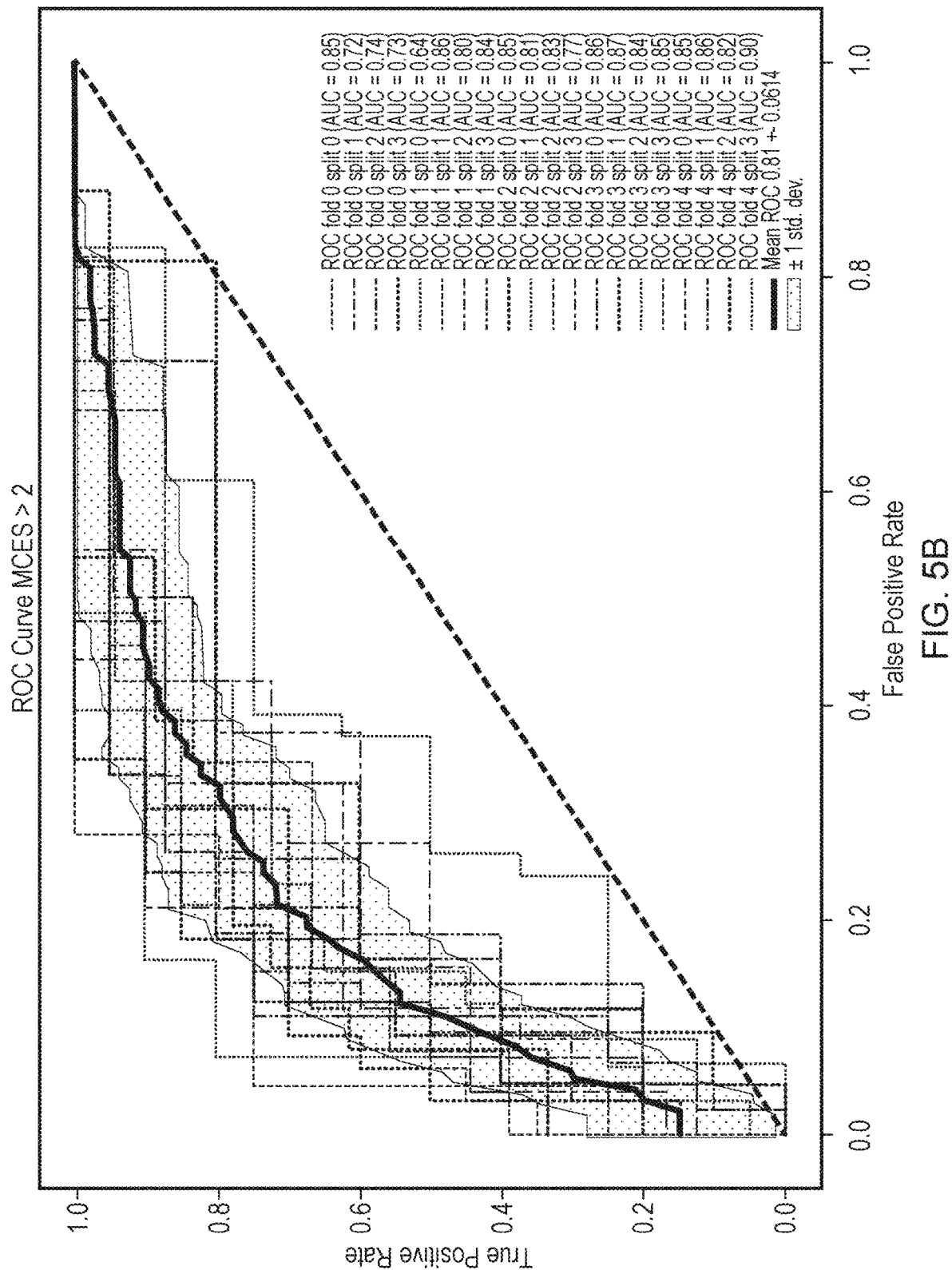

The results of these analyses are shown on FIGS. 5A and 5B, respectively for the first SSN and the second SSN. These figures show the ROC curves (true positive as a function of false positive) obtained for each of the cross-validation iterations (thin curves), the average across these (bold curve), and the ±1 standard deviation envelope (greyed area). The ROC curves shown correspond to the TPR and FPR values for each value of the above-mentioned threshold between 0 and 1, with steps of 0.05. For the first SSN, the AUC (average±standard deviation) was 0.76±0.08. For the second SSN, the AUC (average±standard deviation) was 0.81±0.06. This data shows that the fully automated colonoscopy video analysis approach was able to provide accurate prediction of MCES values for individual colon sections, using raw endoscopic videos as the sole input. This is despite the training being performed using weak labels and a relatively small amount of training data (104 raw videos). Further, MCES≤1 is typically classified as "remission" in clinical trials, and therefore a trustworthy automatic approach to identify those colonoscopy videos that show that the subject is in remission may be particularly valuable.

A larger data set of approximately 1000 videos was subject to quality control as described above. All frames passing the quality control check and their original MCES (0 to 3) annotation were used to train a further SSN. As such, the SSN was trained to output the respective probabilities of each frame belonging to one of four class, corresponding to the four levels of the MCES scale. In some examples, an ordinal classification model was used as described in Cao et al. (Rank-consistent Ordinal Regression for Neural Networks, 2019, arXiv:1901.07884v4). The corresponding average probabilities across frames in a segment were then calculated. A single predicted MCES score was assigned to each segment as the MCES score that has the highest average probability. This SSN was evaluated by cross-validation as explained above, except that instead of calculating ROC curves and AUCs, the Cohen's kappa coefficient was calculated for each iteration of the cross-validation.

The terms "computer system" includes the hardware, software and data storage devices for embodying a system or carrying out a method according to the above described embodiments. For example, a computer system may comprise a central processing unit (CPU), input means, output means and data storage, which may be embodied as one or more connected computing devices. Preferably the computer system has a display or comprises a computing device that has a display to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

Unless context dictates otherwise, the descriptions and definitions of the features set out above are not limited to any particular aspect or embodiment of the invention and apply equally to all aspects and embodiments which are described.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

Other aspects and embodiments of the invention provide the aspects and embodiments described above with the term "comprising" replaced by the term "consisting of" or "consisting essentially of", unless the context dictates otherwise.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

All documents mentioned in this specification are incorporated herein by reference in their entirety.

The invention claimed is:

1. A method of analyzing a colonoscopy video or a portion thereof, the method comprising:
using a first deep neural network classifier to classify image data from the colonoscopy video or portion thereof into one of at least a first severity class and a second severity class, the first severity class being associated with more severe endoscopic lesions than the second severity class, wherein the first deep neural network classifier has been trained at least in part in a weakly supervised manner using training image data from a plurality of training colonoscopy videos, wherein the training image data comprises multiple sets of consecutive frames from the plurality of training colonoscopy videos, wherein each of the frames in a set has a severity class label, and wherein all of the frames in a given set have the same severity class label; and
using a second deep neural network classifier to classify the image data from the colonoscopy video or portion thereof into one of at least a first quality class and a second quality class, wherein the first quality class is associated with better quality images than the second quality class, wherein image data in the first quality class is provided to the first deep neural network classifier, or wherein the second deep neural network classifier has been trained at least in part in a weakly supervised manner using training image data from a plurality of training colonoscopy videos, wherein the training image data comprises multiple sets of consecutive frames from the plurality of training colonoscopy videos, wherein each frame in a set are associated with a quality class label that is the same for all frames in the set, and wherein each set of consecutive frames in the training image data has been assigned a quality class label by visual inspection of the segment of video comprising the respective set of consecutive frames.

2. The method of claim 1, wherein the frames in each set of frames in the training image data correspond to a single anatomical section of a colon depicted in the colonoscopy video or portion thereof.

3. A method of analyzing a colonoscopy video or a portion thereof, the method comprising:
using a first deep neural network classifier to classify image data from the colonoscopy video or portion thereof into one of at least one of a first severity class and a second severity class, the first severity class being associated with more severe endoscopic lesions than the second severity class, wherein the first deep neural network classifier has been trained at least in part in a weakly supervised manner using training image data from a plurality of training colonoscopy videos, wherein the training image data comprises multiple sets of consecutive frames from the plurality of training colonoscopy videos, wherein each of the frames in a set has a severity class label, and wherein all of the frames in a given set have the same severity class label,
wherein each set of frames in the training image data has been assigned a first severity class label if visual inspection associated a segment of training colonoscopy video comprising the set of frames with an endoscopic severity score within a first range, or wherein each set of frames in the training image data has been assigned a first severity class label if two independent visual inspections associated the segment of training colonoscopy video comprising the set of frames with an endoscopic severity score within a first range.

4. The method of claim 3, wherein the endoscopic severity score is a Mayo Clinic endoscopic subscore (MCES), and wherein the first range is MCES>1 or MCES>2.

5. The method of claim 3, wherein the first deep neural network classifier classifies image data into three or more severity classes, wherein each set of frames in the training image data has been assigned one of three or more severity class labels if visual inspection associated the segment of training colonoscopy video comprising the set of frames with an endoscopic severity score within a predetermined distinct range for each of the three or more severity classes, or wherein each set of frames in the training image data has been assigned one of the three or more severity class labels if two independent visual inspections associated the segment of training colonoscopy video comprising the set of frames with an endoscopic severity score within a range associated with the one of the three or more severity class labels, and wherein the endoscopic severity score is a MCES, and the first deep neural network classifier classifies image data into four severity classes, each severity class of the four severity classes being associated with a different MCES.

6. The method of claim 1, wherein the image data from the colonoscopy video or portion thereof comprises multiple consecutive frames, and wherein analyzing the colonoscopy video or portion thereof comprises using the first deep neural network classifier or the second deep neural network classifier to individually classify the multiple consecutive frames in the image data from the colonoscopy video or portion thereof.

7. The method of claim 6, wherein classifying individual frames comprises providing, for each of the multiple consecutive frames, a probability of the frame belonging to the first severity class or a probability of the frame belonging to the second severity class.

8. A method of analyzing a colonoscopy video or a portion thereof, the method comprising:
using a first deep neural network classifier to classify image data from the colonoscopy video or portion thereof one of at least a first severity class and a second severity class, the first severity class being associated with more severe endoscopic lesions than the second severity class, wherein the first deep neural network classifier has been trained at least in part in a weakly supervised manner using training image data from a plurality of training colonoscopy videos, wherein the training image data comprises multiple sets of consecutive frames from the plurality of training colonoscopy videos, wherein each of the frames in a set has a severity class label, and wherein all of the frames in a given set have the same severity class label,
wherein the image data from the colonoscopy video or portion thereof comprises multiple frames and analyzing the colonoscopy video or portion thereof further comprises assigning a summarized severity class for the colonoscopy video or portion thereof based on an individual classification from the first deep neural network classifier for each of the multiple frames, or wherein classifying individual frames comprises providing, for each of the multiple frames, a probability of the frame belonging to the first severity class, and assigning a summarized severity class for the colonoscopy video or portion thereof based on the individual classification for each of the multiple frames comprises: assigning the first severity class if an average of the probabilities of the frames belonging to the first severity class is above a threshold or assigning the first severity class if a proportion of frames assigned to the first severity class is above a threshold.

9. The method of claim 1, wherein one or both of the first deep neural network classifier and the second deep neural network classifier comprises a convolutional neural network (CNN), or wherein one or both of the first deep neural network classifier and the second deep neural network classifier comprise a CNN that has been pre-trained on unrelated image data, or wherein one or both of the first deep neural network classifier and the second deep neural network classifier comprise a 50 layers CNN, or wherein one or both of the first deep neural network classifier and the second deep neural network classifier comprise a CNN that has been pre-trained using a deep residual learning framework.

10. A method of analyzing a colonoscopy video or a portion thereof, the method comprising:
using a first deep neural network classifier to classify image data from the colonoscopy video or portion thereof into one of at least a first severity class and a second severity class, the first severity class being associated with more severe endoscopic lesions than the second severity class, wherein the first deep neural network classifier has been trained at least in part in a weakly supervised manner using training image data from a plurality of training colonoscopy videos, wherein the training image data comprises multiple sets of consecutive frames from the plurality of training colonoscopy videos, wherein each of the frames in a set has a severity class label, and wherein all of the frames in a given set have the same severity class label,
wherein the endoscopic lesions are indicative of ulcerative colitis (UC), or wherein the first severity class is associated with more severe UC than the second severity class, and
wherein analyzing the colonoscopy video or portion thereof, comprises:
(i) analyzing the colonoscopy video or portion thereof using the first deep neural network classifier that classifies image data between a severity class corresponding to MCES>1 and a severity class corresponding to MCES≤1;
(ii) analyzing the colonoscopy video or portion thereof using the first deep neural network classifier that classifies image data between a severity class corresponding to MCES>2 and a severity class corresponding to MCES≤2;
(iii) selecting a subject for treatment for UC with a first treatment if at least one segment of the colonoscopy video is assigned the severity class corresponding to MCES>2, and with a second treatment if no segment of the video is assigned the severity class corresponding to MCES>2, but at least one a segment of the video is assigned the severity class corresponding to MCES>1; and
(iv) treating the subject based on the selection in step (iii).

11. A method of providing a tool for analyzing a colonoscopy video or a portion thereof, the method comprising:
obtaining training image data comprising multiple sets of consecutive frames from a plurality of training colonoscopy videos, wherein each of the frames in a set is associated with a severity class label selected from one of at least a first severity class and a second severity class, wherein the first severity class is associated with more severe endoscopic lesions than the second severity class and wherein all frames in a set are associated with the same class label; and
training a first deep neural network classifier to classify image data into one of the at least first severity class and second severity class, wherein the training is performed in a weakly supervised manner using the training image data and the severity class label;
wherein the method further comprises using a second deep neural network classifier to classify training image data comprising multiple frames into one of at least a first quality class and a second quality class, wherein the first quality class is associated with better quality images than the second quality class, and wherein training the first deep neural network classifier is performed using the training image data that is classified in the first quality class by the second deep neural network classifier, and wherein the method comprises training the second deep neural network classifier at least in part in a weakly supervised manner using training image data from a plurality of training colonoscopy videos, wherein the training image data comprises multiple sets of consecutive frames from the plurality of training colonoscopy videos, wherein each frame in a set is associated with a quality class label that is the same for all frames in the set, and wherein each set of consecutive frames in the training image data has been assigned a quality class label by visual inspection of a segment of video comprising the respective set of consecutive frames.

12. A system for assessing the severity of ulcerative colitis in a subject from a colonoscopy video obtained from the subject, the system comprising:
at least one processor; and
at least one non-transitory computer readable medium containing instructions that, when executed by the at least one processor, cause the at least one processor to perform operations comprising:
classifying image data from the colonoscopy video or portion thereof into one of at least a first severity class and a second severity class, wherein the first severity class is associated with more severe ulcerative colitis than the second severity class, wherein a first deep neural network classifier has been trained at least in part in a weakly supervised manner using training image data from a plurality of training colonoscopy videos, wherein the training image data comprises multiple sets of consecutive frames from the plurality of training colonoscopy videos, and wherein each of the frames in a set includes a severity class label, and wherein all of the frames in a given set have the same severity class label; and
wherein the operations further comprise using a second deep neural network classifier to classify the image data from the colonoscopy video or portion thereof into one of at least a first quality class and a second quality class, wherein the first quality class is associated with better quality images than the second quality class, wherein image data in the first quality class is provided to the first deep neural network classifier, and wherein the second deep neural network classifier has been trained at least in part in a weakly supervised manner using training image data from a plurality of training colonoscopy videos, wherein the training image data comprises multiple sets of consecutive frames from the plurality of training colonoscopy videos, wherein each frame in a set is associated with a quality class label that is the same for all frames in the set, and wherein each set of consecutive frames in the training image data has been assigned a quality class label by visual inspection of a segment of video comprising a respective set of consecutive frames; or wherein each set of frames in the training image data has been assigned a first severity class label if visual inspection associated the segment of training colonoscopy video comprising the set of frames with an endoscopic severity score within a first range, or wherein each set of frames in the training image data has been assigned a first severity class label if two independent visual inspections associated the segment of training colonoscopy video comprising the set of frames with an endoscopic severity score within a first range.

13. The system of claim 12, wherein the frames in each set of frames in the training image data correspond to a single anatomical section of a colon depicted in the colonoscopy video or portion thereof.

14. The system of claim 12, wherein the endoscopic severity score is a Mayo Clinic endoscopic subscore (MCES), and wherein the first range is MCES>1 or MCES>2.

15. The system of claim 12, wherein the first deep neural network classifier classifies image data into three or more severity classes, wherein each set of frames in the training image data has been assigned one of three or more severity class labels if visual inspection associated the segment of training colonoscopy video comprising the set of frames with an endoscopic severity score within a predetermined distinct range for each of the three or more severity classes, or wherein each set of frames in the training image data has been assigned one of the three or more severity class labels if two independent visual inspections associated the segment of training colonoscopy video comprising the set of frames with an endoscopic severity score within a range associated with the assigned one of the three or more severity class labels, and wherein the endoscopic severity score is a MCES, and the first deep neural network classifier classifies image data into four severity classes, each severity class of the four severity classes being associated with a different MCES.

16. The method of claim 3, wherein the frames in each set of frames in the training image data correspond to a single anatomical section of a colon depicted in the colonoscopy video or portion thereof; or wherein the method further comprises using a second deep neural network classifier to classify the image data from the colonoscopy video or portion thereof into one of at least a first quality class and a second quality class, wherein the first quality class is associated with better quality images than the second quality class, wherein image data in the first quality class is provided to the first deep neural network classifier, and wherein the second deep neural network classifier has been trained at least in part in a weakly supervised manner using training image data from a plurality of training colonoscopy videos, wherein the training image data comprises multiple sets of consecutive frames from the plurality of training colonoscopy videos, wherein each frame in a set is associated with a quality class label that is the same for all frames in the set, and wherein each set of consecutive frames in the training image data has been assigned a quality class label by visual inspection of a segment of video comprising the respective set of consecutive frames.

17. The method of claim 8, wherein the frames in each set of frames in the training image data correspond to a single anatomical section of a colon depicted in the colonoscopy video or portion thereof; or wherein the method comprises using a second deep neural network classifier to classify the image data from the colonoscopy video or portion thereof into one of at least a first quality class and a second quality class, wherein the first quality class is associated with better quality images than the second quality class, wherein image data in the first quality class is provided to the first deep neural network classifier, and wherein the second deep neural network classifier has been trained at least in part in a weakly supervised manner using training image data from a plurality of training colonoscopy videos, wherein the training image data comprises multiple sets of consecutive frames from the plurality of training colonoscopy videos, wherein each frame in a set are associated with a quality class label that is the same for all frames in the set, and wherein each set of consecutive frames in the training image data has been assigned a quality class label by visual inspection of a segment of video comprising the respective set of consecutive frames.

18. The method of claim 10, wherein the frames in each set of frames in the training image data correspond to a single anatomical section of a colon depicted in the colonoscopy video or portion thereof; or wherein the method comprises using a second deep neural network classifier to classify the image data from the colonoscopy video or portion thereof into one of at least a first quality class and a second quality class, wherein the first quality class is associated with better quality images than the second quality class, wherein image data in the first quality class is provided to the first deep neural network classifier, and wherein the second deep neural network classifier has been trained at least in part in a weakly supervised manner using training image data from a plurality of training colonoscopy videos, wherein the training image data comprises multiple sets of consecutive frames from the plurality of training colonoscopy videos, wherein each frame in a set is associated with a quality class label that is the same for all frames in the set, and wherein each set of consecutive frames in the training image data has been assigned a quality class label by visual inspection of a segment of video comprising the respective set of consecutive frames.

19. The method of claim 1, wherein each set of frames in the training image data has been assigned a first severity class label if visual inspection associated a segment of training colonoscopy video comprising the set of frames with an endoscopic severity score within a first range, or wherein each set of frames in the training image data has been assigned a first severity class label if two independent visual inspections associated the segment of training colonoscopy video comprising the set of frames with an endoscopic severity score within a first range; or wherein the image data from the colonoscopy video or portion thereof comprises multiple frames and analyzing the colonoscopy video or portion thereof further comprises assigning a summarized severity class for the colonoscopy video or portion thereof based on an individual classification from the first deep neural network classifier for each of the multiple frames, or wherein classifying individual frames comprises providing, for each of the multiple frames, a probability of the frame belonging to the first severity class, and assigning a summarized severity class for the colonoscopy video or portion thereof based on the individual classification for each of the multiple frames comprises: assigning the first severity class if an average of the probabilities of the frames belonging to the first severity class is above a threshold or assigning the first severity class if a proportion of frames assigned to the first severity class is above a threshold.

20. The method of claim 1, wherein the endoscopic lesions are indicative of ulcerative colitis (UC), or wherein the first severity class is associated with more severe UC than the second severity class, and wherein analyzing the colonoscopy video or portion thereof, comprises:
(i) analyzing the colonoscopy video or portion thereof using the first deep neural network classifier that classifies image data between a severity class corresponding to MCES>1 and a severity class corresponding to MCES≤1;
(ii) analyzing the colonoscopy video or portion thereof using the first deep neural network classifier that classifies image data between a severity class corresponding to MCES>2 and a severity class corresponding to MCES≤2;
(iii) selecting a subject for treatment for UC with a first treatment if at least one segment of the colonoscopy video is assigned the severity class corresponding to MCES>2 and with a second treatment if no segment of the video is assigned the severity class corresponding to MCES>2, but at least one a segment of the video is assigned the severity class corresponding to MCES>1; and
(iv) treating the subject based on the selection in step (iii).

* * * * *